(12) United States Patent
Henry

(10) Patent No.: US 9,140,961 B2
(45) Date of Patent: Sep. 22, 2015

(54) CAMERA BODY WITH INTEGRAL STRAP CONNECTOR

(71) Applicant: Black Rapid, Inc., Seattle, WA (US)

(72) Inventor: Ronald Dean Henry, Seattle, WA (US)

(73) Assignee: Black Rapid, Inc., Seattle, WA (US)

( * ) Notice: Subject to any disclaimer, the term of this patent is extended or adjusted under 35 U.S.C. 154(b) by 0 days.

(21) Appl. No.: 14/450,456

(22) Filed: Aug. 4, 2014

(65) Prior Publication Data

US 2014/0341557 A1 Nov. 20, 2014

Related U.S. Application Data

(63) Continuation of application No. 13/767,003, filed on Feb. 14, 2013.

(51) Int. Cl.
*G03B 17/00* (2006.01)
*G03B 17/56* (2006.01)
*A45F 5/00* (2006.01)
*G03B 17/02* (2006.01)
*A45F 3/14* (2006.01)

(52) U.S. Cl.
CPC . *G03B 17/56* (2013.01); *A45F 3/14* (2013.01); *A45F 5/00* (2013.01); *G03B 17/02* (2013.01); *G03B 17/561* (2013.01); *G03B 17/566* (2013.01); *A45F 2005/006* (2013.01); *A45F 2200/0533* (2013.01)

(58) Field of Classification Search
USPC ............. 396/419, 423, 424; 248/186.2, 187.1
See application file for complete search history.

(56) References Cited

U.S. PATENT DOCUMENTS

| 2,679,707 | A | | 7/1952 | Merlino | |
|---|---|---|---|---|---|
| 4,058,242 | A | * | 11/1977 | Brewer | 224/606 |
| 4,274,181 | A | * | 6/1981 | Schaller | 24/656 |
| 7,654,027 | B1 | * | 2/2010 | Grover | 42/85 |
| 8,516,732 | B2 | * | 8/2013 | Burnsed, Jr. | 42/85 |
| 2008/0292303 | A1 | * | 11/2008 | Kope et al. | 396/423 |
| 2010/0284681 | A1 | * | 11/2010 | Kope et al. | 396/423 |
| 2011/0081143 | A1 | * | 4/2011 | Kope et al. | 396/423 |
| 2012/0014686 | A1 | * | 1/2012 | Kope et al. | 396/423 |
| 2012/0048901 | A1 | | 3/2012 | Wong | |
| 2012/0189294 | A1 | | 7/2012 | Geller | |
| 2013/0101280 | A1 | * | 4/2013 | Xu | 396/423 |

* cited by examiner

*Primary Examiner* — Clayton E Laballe
*Assistant Examiner* — Warren K Fenwick
(74) *Attorney, Agent, or Firm* — Davis Wright Tremaine LLP; George C. Rondeau, Jr.

(57) ABSTRACT

Couplers that are configured to engage with an attachment point on a camera or lens. Following general camera construction, the attachment points are typically found on the bottom of the camera or lens. The attachment points may be specifically configured to engage with the couplers. The couplers may be freely rotatable relative to the camera to prevent binding or tangling of a camera strap to which the couplers are connected.

25 Claims, 23 Drawing Sheets though some camera constructions include the attachment point 20 on the side of the camera body, or elsewhere. This attachment point 20 is on the camera body which is the structural shell of the camera 24 that houses the camera's components.

CAMERA BODY WITH INTEGRAL STRAP CONNECTOR

RELATED APPLICATIONS

This application is a continuation of U.S. patent application Ser. No. 13/767,003, filed Feb. 14, 2013, which is fully incorporated herein by reference.

FIELD OF THE INVENTION

Embodiments of the present invention relate generally to camera equipment, and more particularly, to connections for straps for carrying camera equipment.

BACKGROUND

Conventional straps help users store and transport various objects when not in use. Such objects may include cameras, camera bags, video recording devices, laptop bags, purses, and the like. Typically, a user will position a strap over one of his shoulders such that the object rests comfortably by his side. Conventional camera storage and carrying systems help to store and transport cameras when not in use. Unfortunately, they include aspects that can hinder retrieval of a camera being stored or transported so that photographic opportunities can be missed.

DETAILED DESCRIPTION

Figure 1:
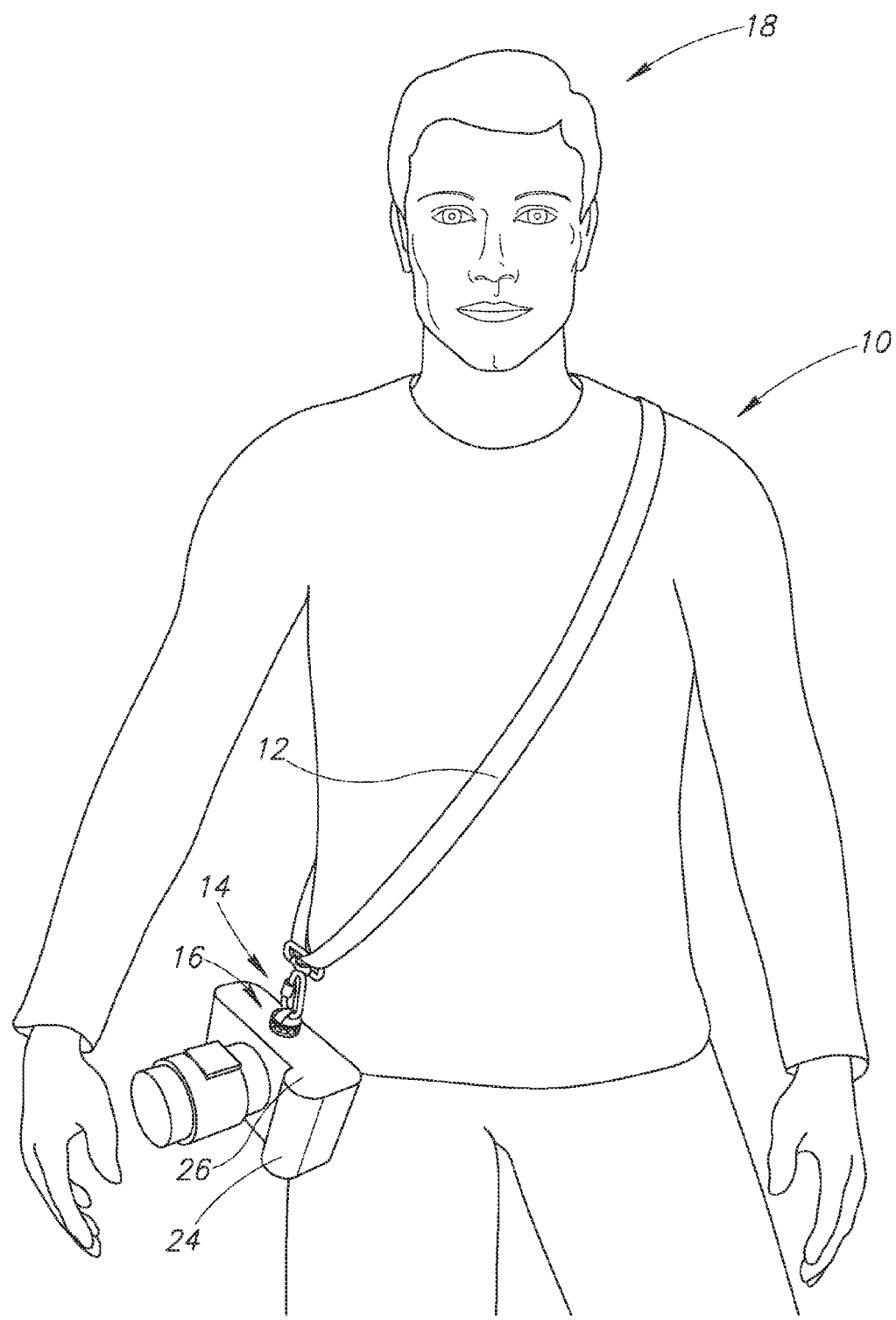
FIG. 1 is a front view of an embodiment of a camera transport system, shown with a camera in a resting position and a camera strap being worn diagonally across the torso of a user.
Figure 2:
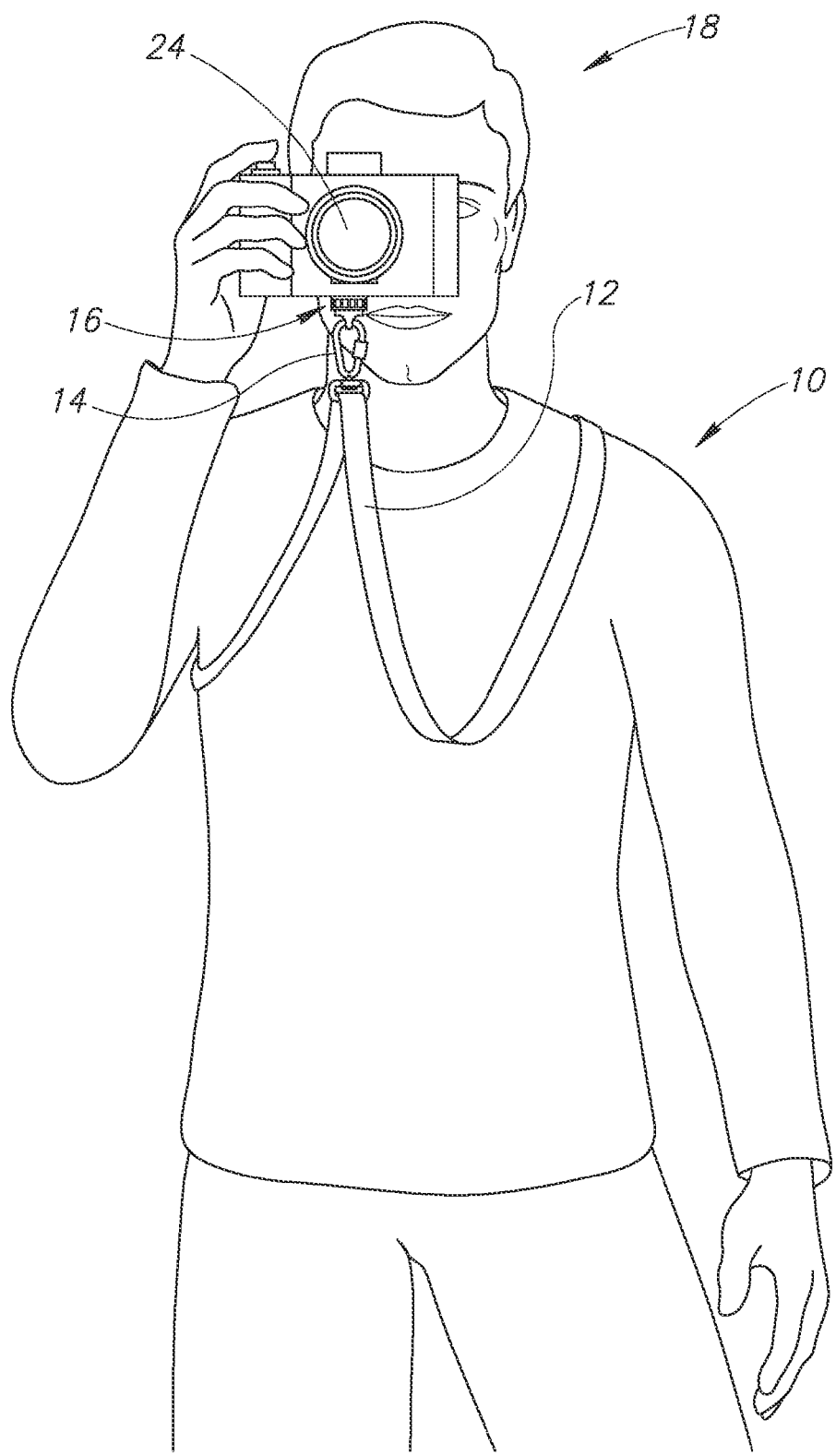
FIG. 2 is a front view of the camera transport system depicted in FIG. 1, shown with the camera in a shooting position.

Referring to FIGS. 1 and 2, a camera transport system 10 including a strap 12, a camera strap connector 14, and a camera connector 16 is shown. The strap 12 is worn by a user 18. The camera connector 16 is configured to engage with a conventional threadable stand socket 20 (see FIG. 4) on a camera 24 otherwise reserved for engagement with a camera stand such as a tripod, monopod, or the like. Following general camera construction, the attachment point or socket 20 is found on the bottom 26 of the camera body of the camera 24 or on the camera's lens. In some embodiments, the camera strap connector 14 is slidably attached to the strap 12 to assist with repositioning of the camera 24 from a transport position to a picture taking or "shooting" position by sliding the camera along the strap. In the illustrated embodiment the camera strap connector 14 is releasably attached to the camera connector 16, but may also be permanently attached to the camera connector or formed as an integral component or portion of the camera connector.

As shown in FIGS. 1 and 2, the strap 12 can be worn, by the user 18, diagonally across the torso. The strap 12 can further include a variety of adjusters (not shown) for adjusting its length, tension, and fit. Further included can be a variety of release mechanisms and fasteners, or camera movement limiting devices in the form of buckles configured to limit the movement of the camera strap connector 14 along the strap 12.

The camera 24 may be one or more of slidably, rotatably, pivotally, and releasably coupled to the strap 12 via the camera strap connector 14 and the camera connector 16. The camera 24 can rest near the lower end portion of the strap 12 in various positions as desired by the user, when not in use. Such resting positions for the camera 24 can include hanging topside-down, as shown in FIG. 1.

The camera transport system 10 is depicted in FIG. 2 with the camera 24 topside-up in a shooting position and being held by the user 18 for facilitating use of the camera to take a picture. As shown, the user 18 can conveniently grasp the camera 24 and raise it into shooting position to take a photo or video. In some embodiments, the strap 12 has a flat sectional profile as shown and in other embodiments, the strap can have other sectional profiles such as including oblong and round profiles. Any suitable material may be used to form the strap 12. One suitable material is nylon webbing.

Figure 3:
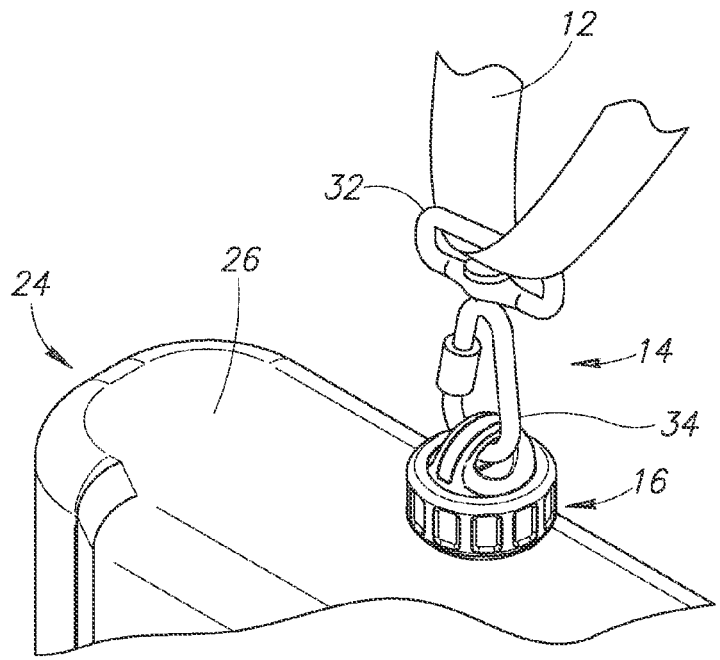
FIG. 3 is a perspective view of a first embodiment of a camera connector coupled to the camera of FIG. 1.
Figure 4:
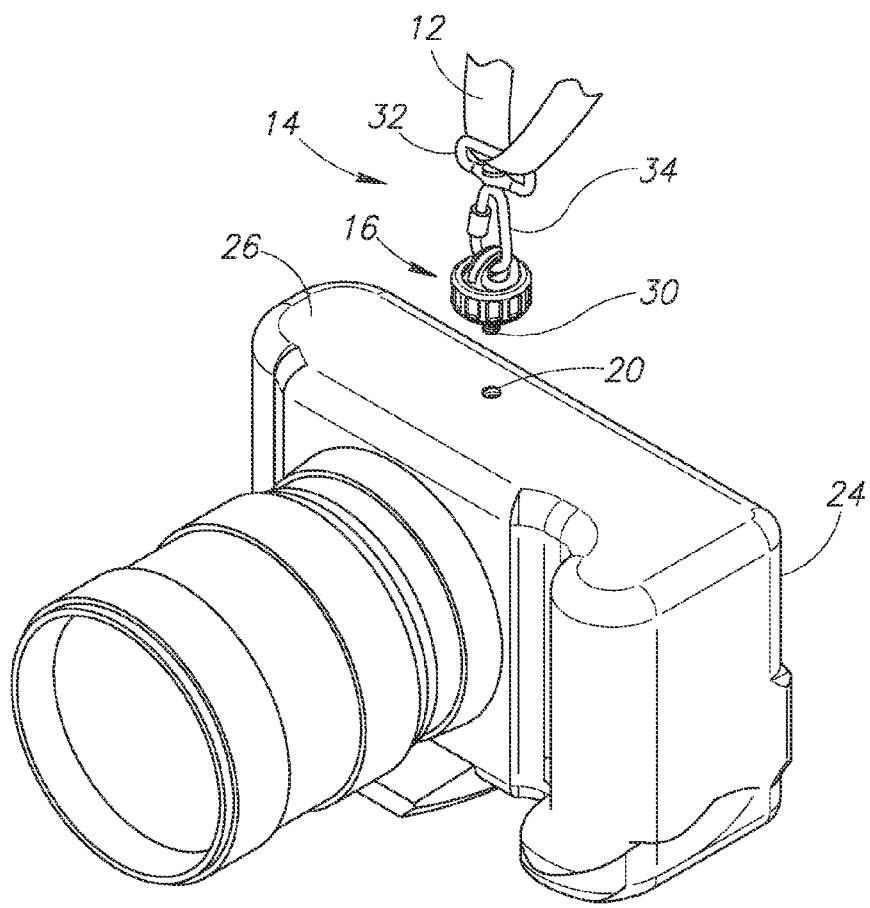
FIG. 4 is a perspective view of the camera connector of FIG. 3 shown disconnected from the camera.
Figure 5:
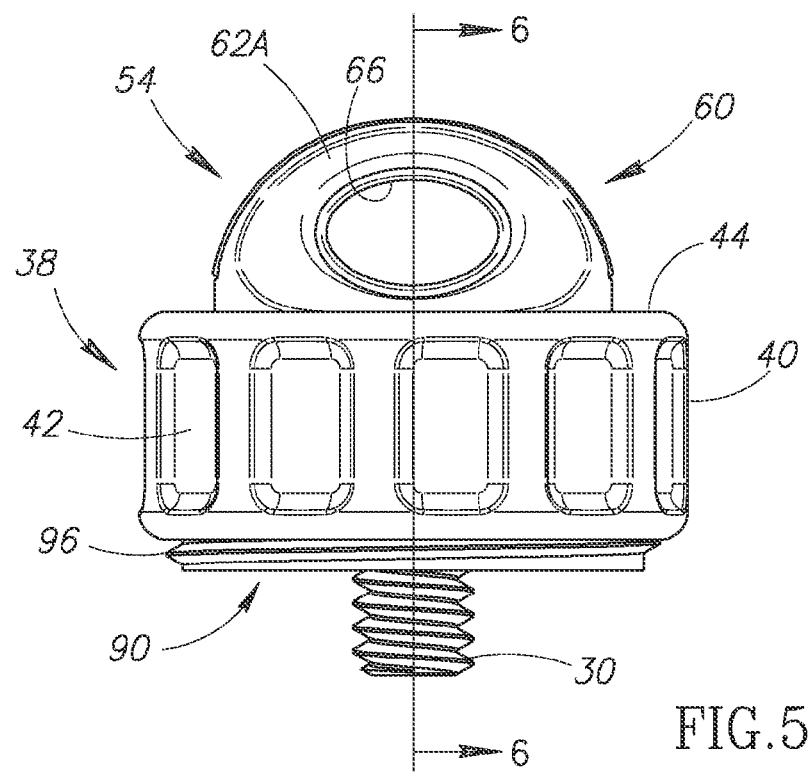
FIG. 5 is an enlarged elevational view of the camera connector of FIG. 3.

FIGS. 3-7 illustrate various views of the camera connector 16 shown in FIGS. 1 and 2. FIG. 3 illustrates an enlarged perspective view of the camera connector 16 attached to both the camera 24 and the camera strap connector 14. FIG. 4 illustrates a perspective view of the camera connector 16 when disconnected from the camera 24 but still connected to the camera strap connector 14. As shown in FIGS. 4 and 5, the camera connector 16 includes a threadable element 30 that is releasably threadably engagable with the threaded stand socket 20 (such as a tripod or a monopod) of the camera body or lens of the camera 24.

The camera strap connector 14 includes a strap engagement portion 32 in the form of a loop that slidably engages with the strap 12 and allows the camera 24 to be moved along the length of the strap, from the resting or transport location (see FIG. 1) to the shooting position (see FIG. 2) and back again to the resting location. The camera strap connector 14 also includes a latch portion 34 pivotally coupled to the strap engagement portion 32, which provides for quick engagement and disengagement with the camera connector 16 and hence allows separation of the camera 24 from the strap 12 worn by the user. The pivotal coupling of the latch portion 34 to the strap engagement portion 32 also promotes proper placement of the camera 24 on the user 18, as well as prevention of binding or tangling of the strap 12. In some embodiments, the latch portion 34 is of the clip or hook type or carabineer type, and has a gate style mechanism to permit connecting and disconnecting of it from a loop portion (discussed below) of the camera connector 16, which facilitates removal of the camera 24 from the user 18 without removing the strap 12 from the user.

Figure 6:
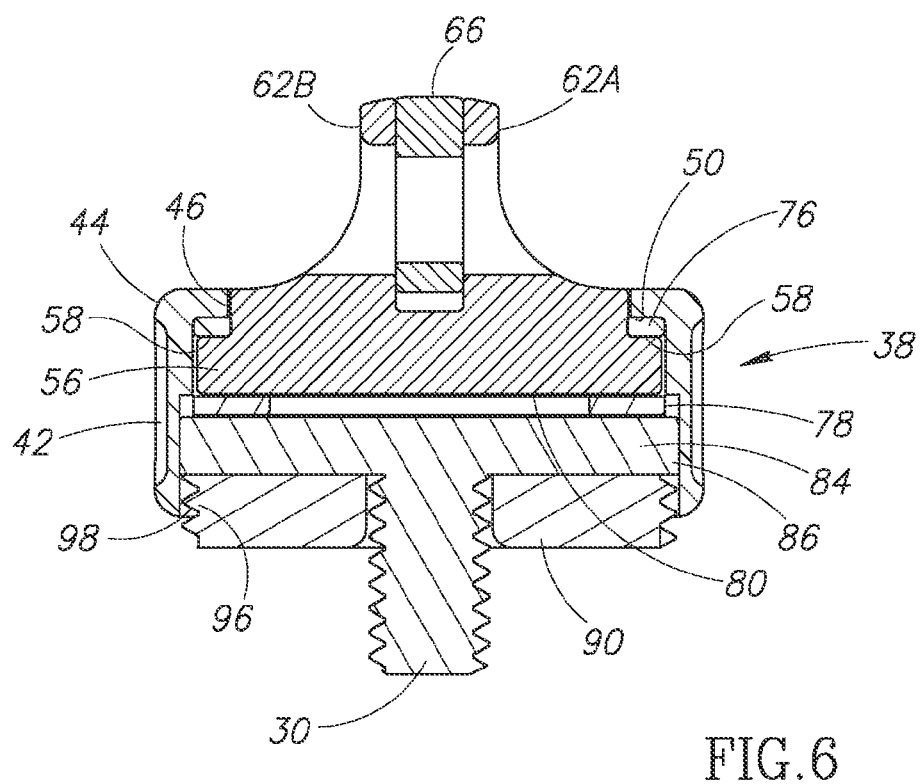
FIG. 6 is a sectional view of the camera connector of FIG. 5 taken substantially along the line 6-6 of FIG. 5.
Figure 7:
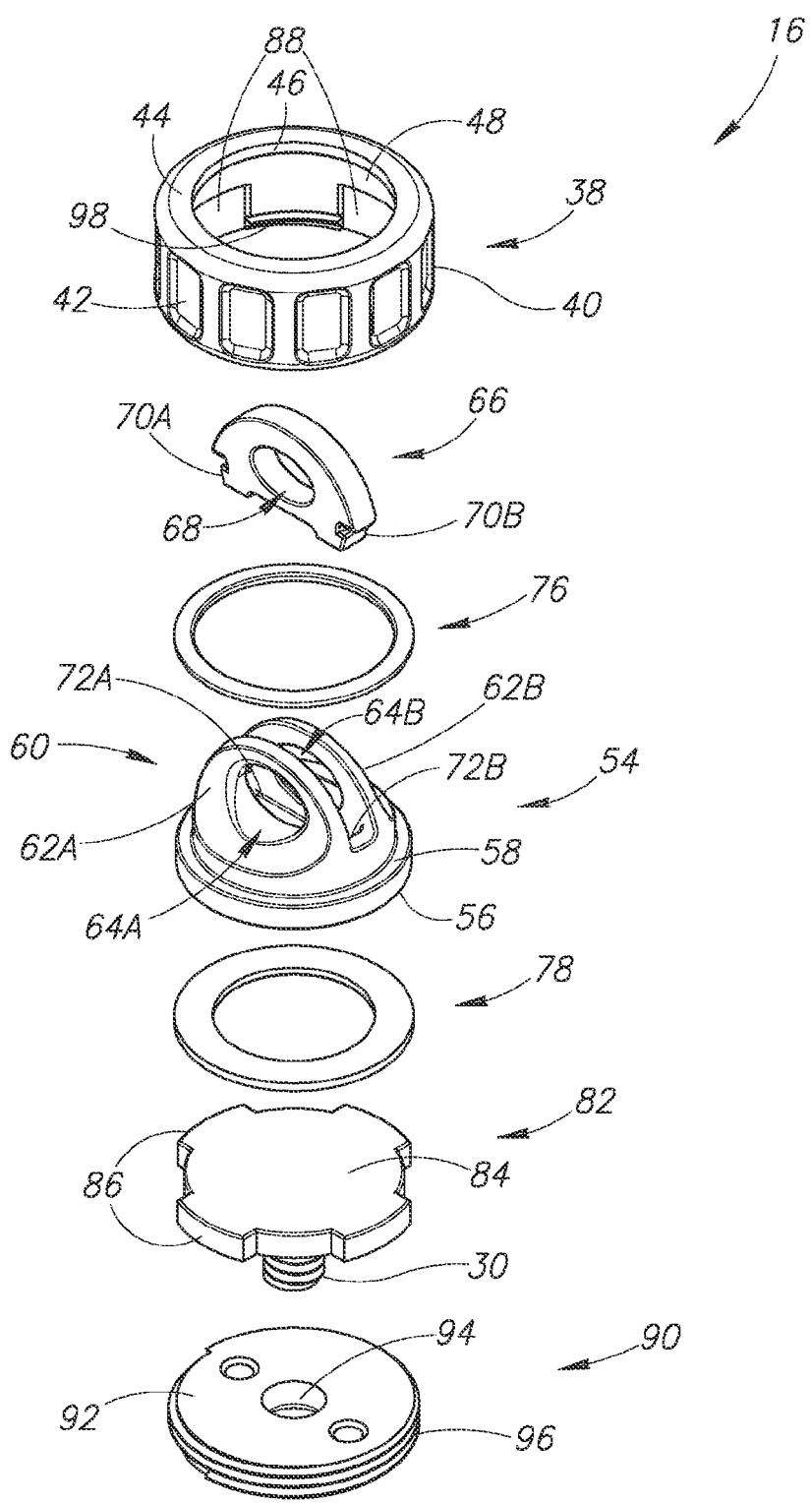
FIG. 7 is an exploded perspective view of the camera connector of FIG. 5.
Figure 8:
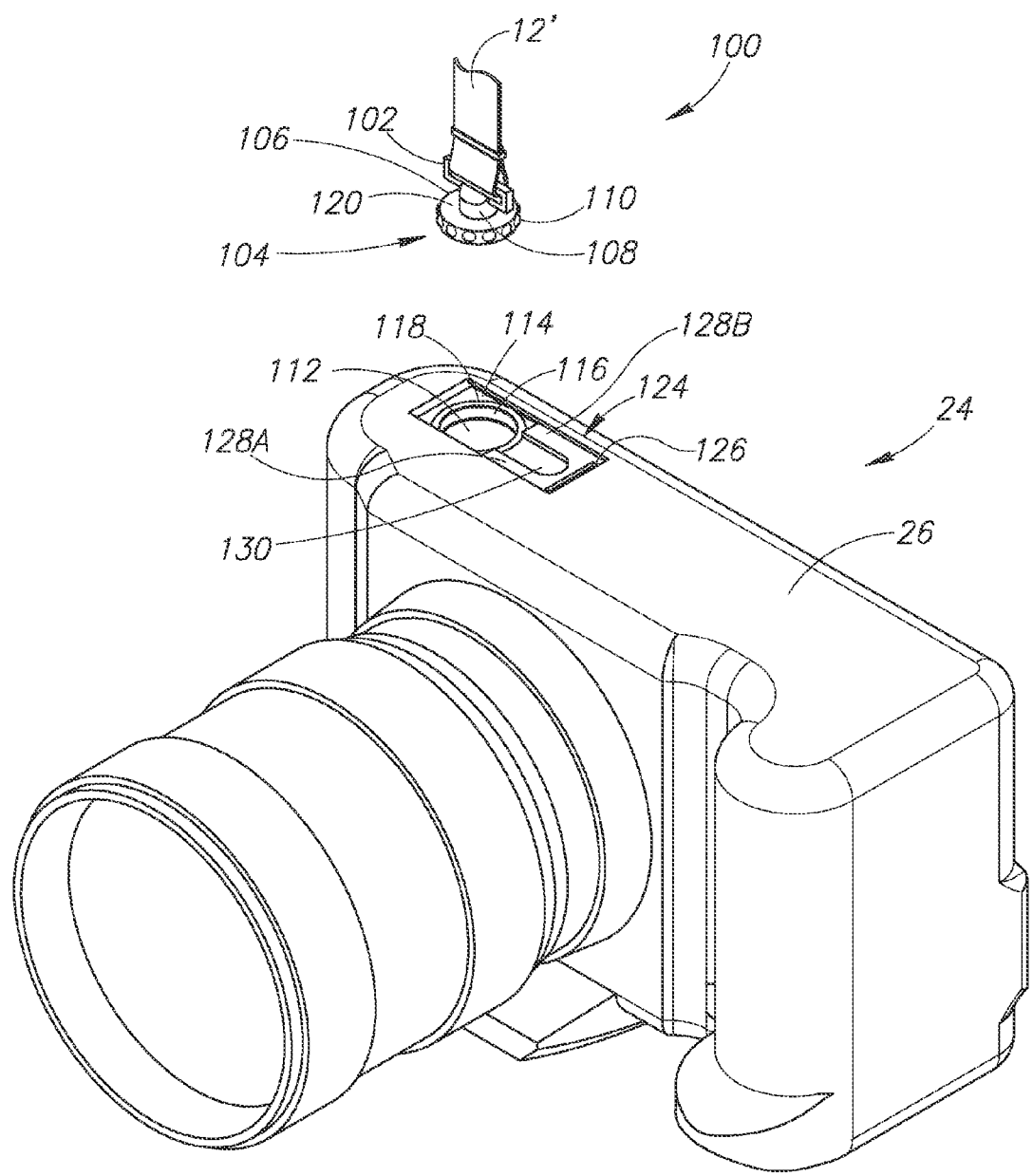
FIG. 8 is a perspective view of a second embodiment of a camera connector when disconnected from a camera.

As shown in FIG. 5, the camera connector 16 includes a base 38 comprising a generally cylindrically-shaped sidewall 40 having an outer gripped surface 42. The various components of the camera connector 16 are illustrated in FIG. 7, which is a top perspective exploded view of the camera connector. Many of the components of the camera connector 16 are also shown in assembled form in the sectional view of FIG. 6. The base 38 includes a ring-shaped upper end portion 44 disposed above the sidewall 40 that has an inner edge portion 46 forming an opening having a circumference that is smaller than an inner surface 48 of the sidewall. An interior bottom surface 50 (see FIG. 6) of the upper end portion 44 forms a downward facing shoulder that extends around the periphery of the upper end portion 44 of the sidewall 40.

The camera connector 16 also includes a rotatable top cap 54 comprising a generally disc-shaped base portion 56 having a top surface 58. Projecting upward from base portion 56 is a loop portion 60 comprising two opposing raised portions 62A and 62B having respective apertures 64A and 64B therein for receiving the latch portion 34 of the strap connector 14 (see FIG. 3). In some embodiments, an insert 66 is provided that includes an aperture 68 therein that is slightly smaller in size than the apertures 64A and 64B in the raised portions 62A and 62B, respectively. The insert 66 includes locking tabs 70A and 70B on each of its ends that are insertable into corresponding tab recesses 72A and 72B, respectively, disposed in the top cap 54 in between the raised portions 62A and 62B. The insert 66 may be formed from a relatively soft elastic material (e.g., rubber, plastic, etc.) so that the insert lock tabs 70A and 70B can be locked or "snapped" into the tab recesses 72A and 72B, respectively. The aperture 68 in the insert 66, being smaller in size than the apertures 64A and 64B in the raised portions 62A and 62B, provides a relatively soft contact surface for the latch portion 34 of the camera strap connector 14. Thus, the insert 66 acts as a noise dampener between the latch portion 34 and the camera connector 16. Such noise suppression may be important in certain circumstances, such as when the user 18 is taking pictures in a quiet setting, or when the user is recording video/audio using the camera 24 and any sound from the camera or camera strap 12 would be undesirable.

The camera connector 16 also includes a friction-reducing top washer 76 (e.g., Delrin®-Acetal washer) positionable over the top surface 58 of the base 56 of the top cap 54. As shown in FIG. 6, during assembly the top cap 54 is insertable into the base 38 from below such that the raised portions 62A and 62B project upwardly through the opening defined by the inner edge 46 of the upper end portion 44 of the base. The upward movement of the top cap 54 is restricted by the downward facing shoulder 50 of the upper end portion 44, which is in contact with the upper surface of the top washer 76.

A friction-reducing bottom washer 78 (e.g., Delrin®-Acetal washer) is insertable into the base 38 from below and is positionable against a bottom surface 80 (see FIG. 6) of the base portion 56 of the top cap 54. A keyed threaded connector 82 is insertable into the base 38 from below and is in a position under and contacting the bottom washer 78. The keyed threaded connector 82 includes a head portion 84 having keyed portions 86 that correspond to "key hole" slots or portions 88 disposed on the inner surface 48 of the sidewall 40 of the base 38. The threaded element 30 of the camera connector 16 is formed as a part of the keyed threaded connector 82 and extends downward from the head portion 84. Once inserted into the base 38, the keyed threaded connector 82 is restricted from rotational movement relative to the base due to the keyed portions 86 extending into the key hole portions 88.

The top and bottom washers 76 and 78, respectively, the top cap 54, and the keyed threaded connector 82 are retained inside the base 38 by a threaded bottom cap 90. The bottom cap 90 includes a body portion 92 having an aperture 94 therein sized to allow the threaded element 30 of the keyed threaded connector 82 to pass therethrough. The body portion 92 of the bottom cap 90 includes exterior threads 96 along its perimeter configured to threadably engage interior threads 98 disposed on the lower inner surface 48 of the sidewall 40 of the base 38 so that the bottom cap may be secured to the base.

Once assembled, the top cap 54, which is disposed between the top and bottom friction-reducing washers 76 and 78, may be freely rotated relative to the base 38. The base 38 and the keyed threaded connector 82 are fixed relative to each other and to the camera 24 when coupled thereto. Thus, when the camera strap connector 14 is coupled to the camera connector 16 as shown in FIG. 3, the top cap 54 (and its raised portions 62A and 62B) may freely rotate relative to the camera 24. This feature prevents binding or tangling of the strap 12.

Since the keyed threaded connector 82 is fixed relative to the base 38, a user may grasp the gripped surface 42 of the base and couple the camera connector 16 to the socket 20 of the camera 24 by placing the threaded portion 30 into the socket and rotating the camera connector relative to the camera in a first rotational direction to advance the threaded portion 30 into the socket. When the user wishes to remove the camera connector 16 from the camera 24, the user may similarly grasp the gripped surface 42 and rotate the camera connector relative to the camera in an opposite second rotational direction.

FIGS. 8 and 9A-9D illustrate a second embodiment of a camera connector 100. The camera connector 100 includes a strap coupling portion 102 in the form of a loop for coupling to a camera strap 12'. The camera connector 100 also includes a camera coupling portion 104 comprising a disc-shaped plate 106. The camera coupling portion 104 is coupled to the strap coupling portion 102 via a neck portion 108. The plate 106 comprises a plurality of ball bearings 110 protruding outwardly around the circumference thereof. In some embodiments, the plurality of ball bearings 110 are biased outward by a biasing mechanism positioned within the plate 106. For example, the biasing mechanism may comprise one or more springs positioned inside the plate 106 configured to bias each of the ball bearings 110 outward.

In this embodiment, the bottom surface 26 of the camera 24 includes a circular-shaped cavity 112 formed within a rectangular recessed portion 114. A sidewall 116 of the cavity 112 curved inward to form a ball bearing race or groove shaped to receive the plurality of ball bearings 110, as may best be seen in FIG. 9D. An upper rim portion 118 (or locking portion) of the cavity 112 may be sized to be slightly larger than the diameter of the plate 106 but slightly smaller than the diameter of the plate including the ball bearings 110 protruding from the plate. Thus, when a user moves the camera coupling portion 104 toward the cavity 112, the upper rim portion 118 of the cavity forces the ball bearings 110 inward as the camera coupling portion 104 is pressed downward into the cavity. Once the plate 106 has been inserted into the cavity 112 such that a top surface 120 of the plate is substantially coplanar with the upper rim 118 of the cavity 112, the ball bearings 110 again move outward due to their outward bias force and to position the ball bearings in the ball bearing groove 114 formed by the sidewall of the cavity. This configuration forms a "snap fit" which retains the camera connector 100 in a coupled configuration with the camera 24.

Also disposed within the recessed portion 114 is a sliding plate 124 comprising a grip tab 126 and first and second spaced apart prongs 128A and 128B forming an opening 130 therebetween. The opening 130 between the first and second prongs 128A and 128B is sized to receive the neck portion 108 of the camera connector 100 when the user slides the sliding plate 124 from an open position shown in FIG. 9B to a closed position shown in FIG. 9C. To move the sliding plate 124 from the opened position to the closed position and vice versa, the user may apply a horizontal force to the grip tab 126. Since the width of the opening 130 of the sliding plate is greater than the size of the neck portion 108 but smaller than the diameter of the plate 106, the sliding plate acts to secure the camera connector 100 to the camera 24 by restricting the vertical movement of the camera coupling portion 104 away from the camera 24 when the sliding plate is in the closed position.

Once the camera connector 100 is coupled to the camera 24, the ball bearings 110 within the ball bearings groove 116 allow the camera coupling portion 104 to freely rotate relative to the cavity 112 about a vertical axis of the cavity, such that the camera connector may freely rotate relative to the camera during use.

Figure 9A:
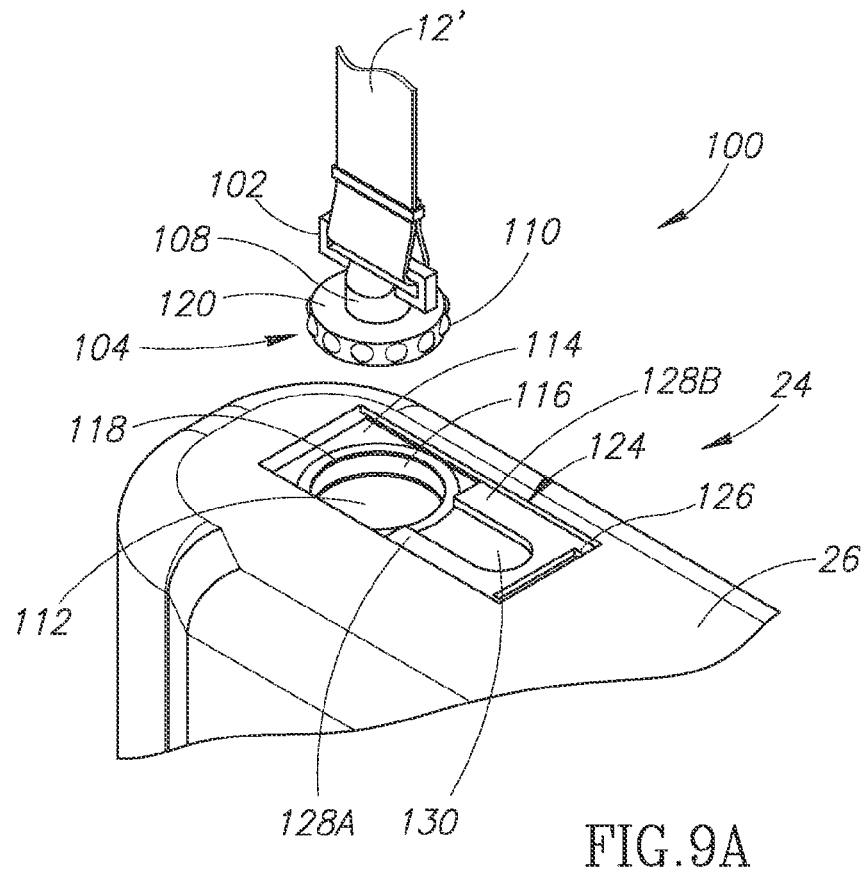
FIG. 9A is an enlarged perspective view of the camera connector of FIG. 8.
Figure 9B:
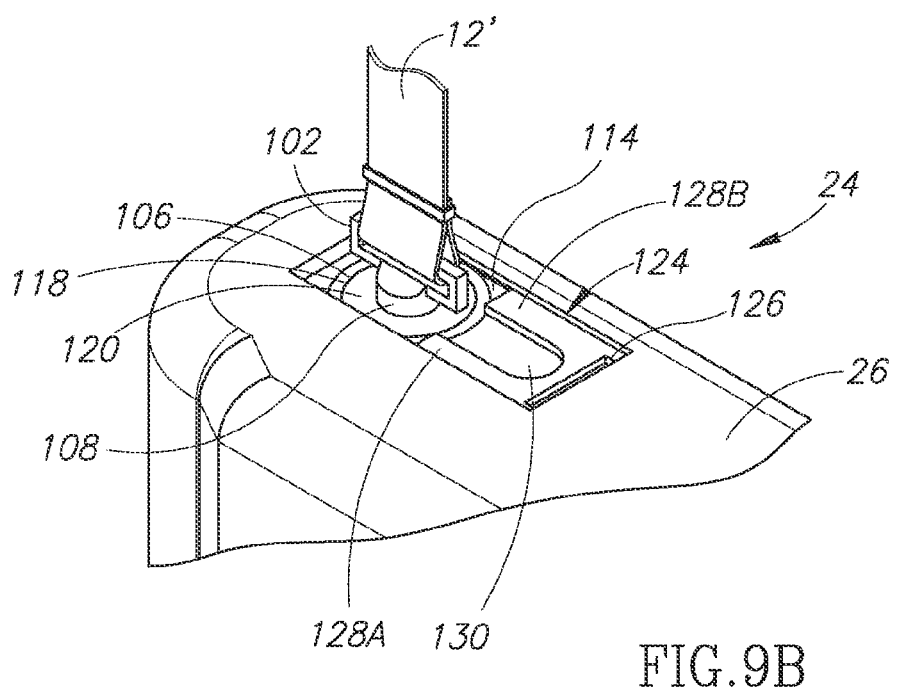
FIG. 9B is a perspective view of the camera connector of FIG. 8 when the camera connector is coupled to the camera.
Figure 9C:
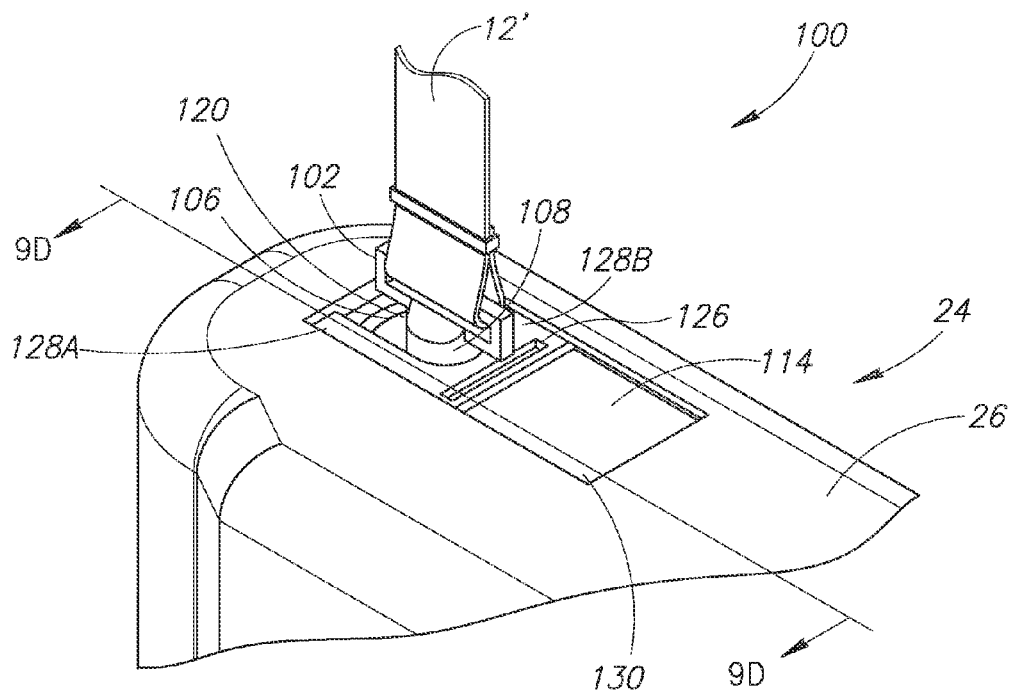
FIG. 9C is a perspective view of the camera connector of FIG. 8 when a sliding plate is moved into a closed position over the camera connector.
Figure 9D:
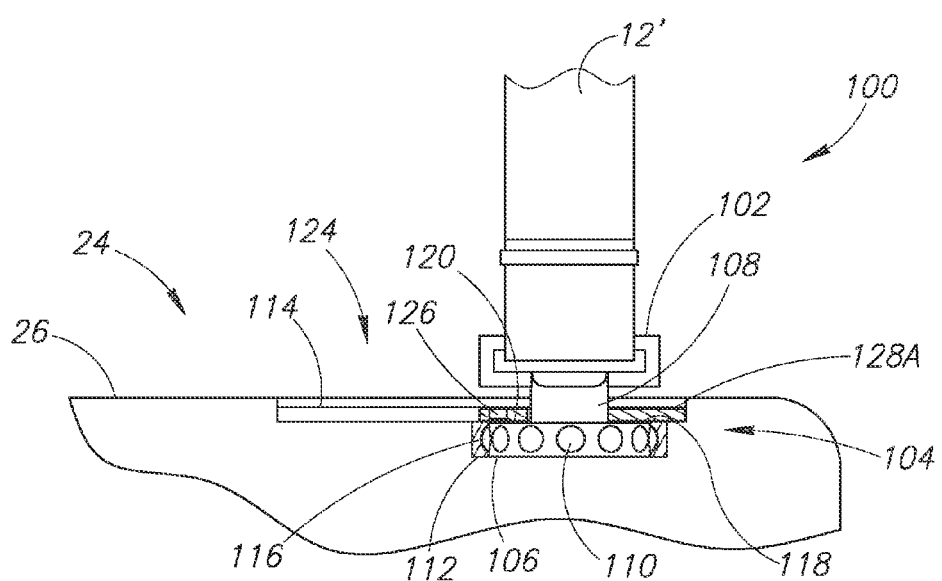
FIG. 9D is a sectional view of the camera connector of FIG. 8 taken substantially along the line 9D-9D of FIG. 9O.

When the user wishes to decouple the camera connector 100 from the camera 24, the user may first slide the sliding plate 124 from the closed position shown in FIG. 9C into the open position shown in FIG. 9B. The user may then grasp the strap 12' or the strap coupling portion 102 of the camera connector 100 and apply an upward force thereto sufficient to overcome the "snap fit" force between the ball bearings 110 and the upper rim portion 118 of the cavity 112 so the ball bearings 110 move upward and the plate 106 is removable from the cavity 112.

By providing the cavity 112 and sliding plate 124 within the recessed portion 114, the overall height of the camera 24 is maintained. That is, the cavity 112 and sliding plate 124 do not increase the form factor of the bottom surface 26 of the camera 24.

FIGS. 10A-G illustrate another embodiment of a camera 140 including components for coupling the camera to a camera strap 12". The components in this embodiment include a camera mounted part or post 142 coupled to the camera 140 within a recessed portion or cavity 144 in the bottom of the camera, and a strap coupled part 146 coupled to a strap portion 148 of the strap 12". These components allow the strap 12" to pivot freely relative to the camera 140, and may be quickly and easily manipulated to disconnect or connect the strap from or to the camera.

Figure 10A:
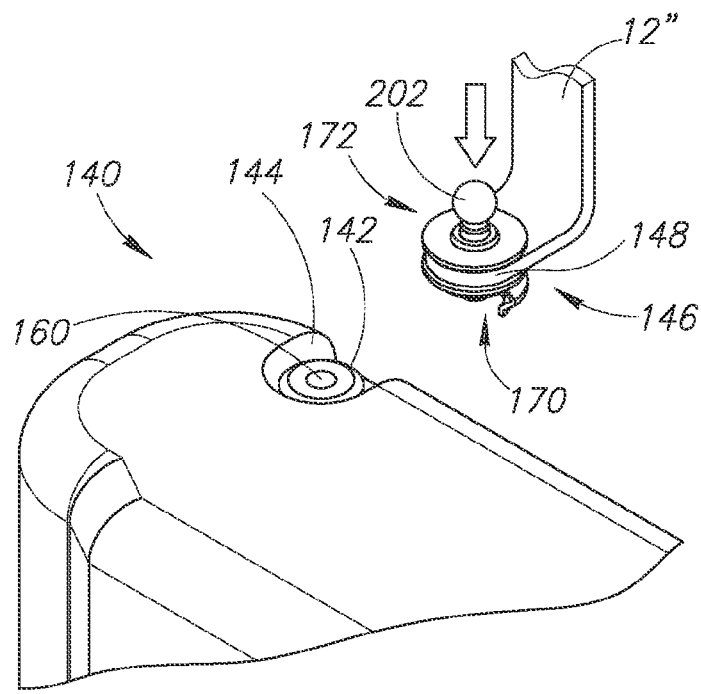
FIG. 10A is a perspective view of a third embodiment of a camera connector when a plunger thereof is in a lowered position and the camera connector is disconnected from a camera.
Figure 10B:
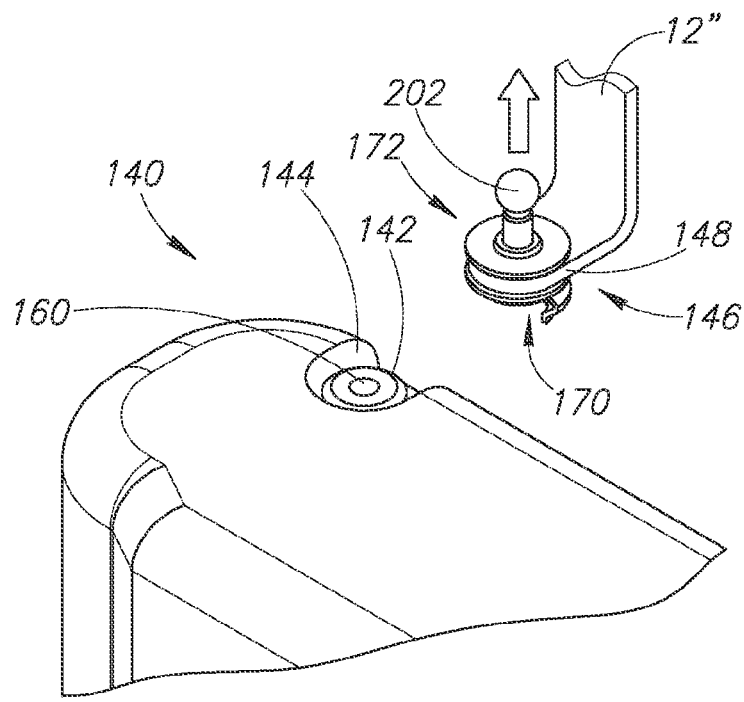
FIG. 10B is a perspective view of the camera connector of FIG. 10A when the plunger is in a raised position and the camera connector is disconnected from the camera.
Figure 10C:
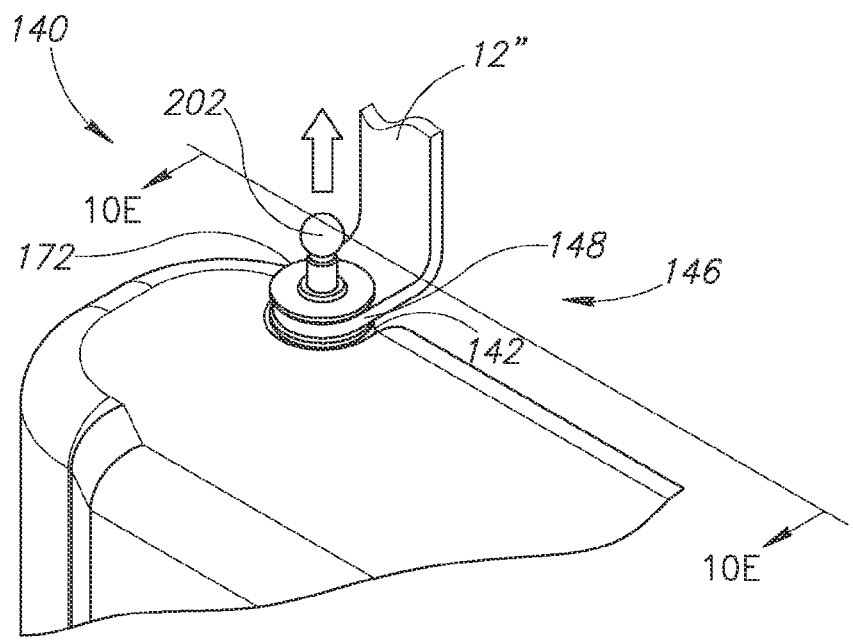
FIG. 10C is a perspective view of the camera connector of FIG. 10A when the plunger is in a raised position and the camera connector is in position for connection to the camera.
Figure 10D:
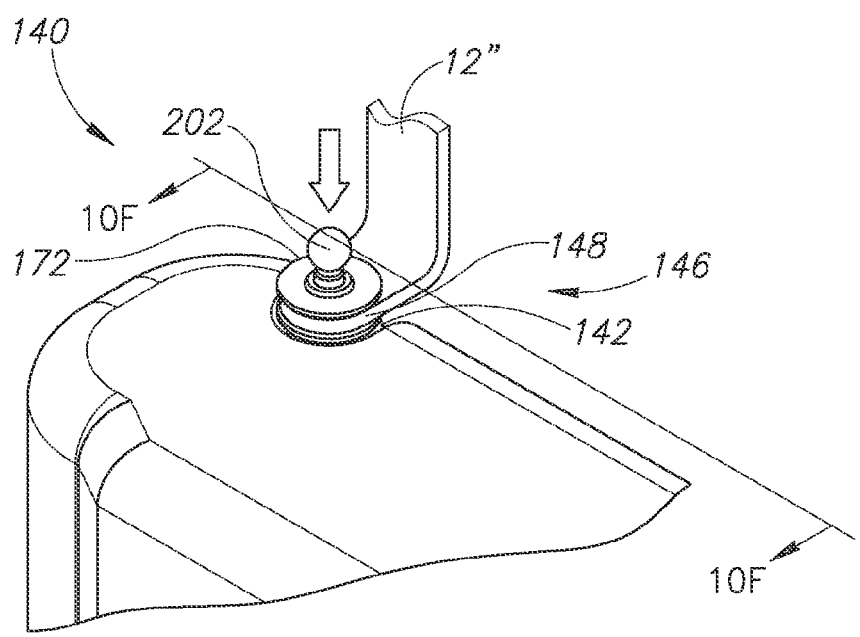
FIG. 10D is a perspective view of the camera connector of FIG. 10A when the plunger is in a lowered position and the camera connector is connected to the camera.
Figure 10E:
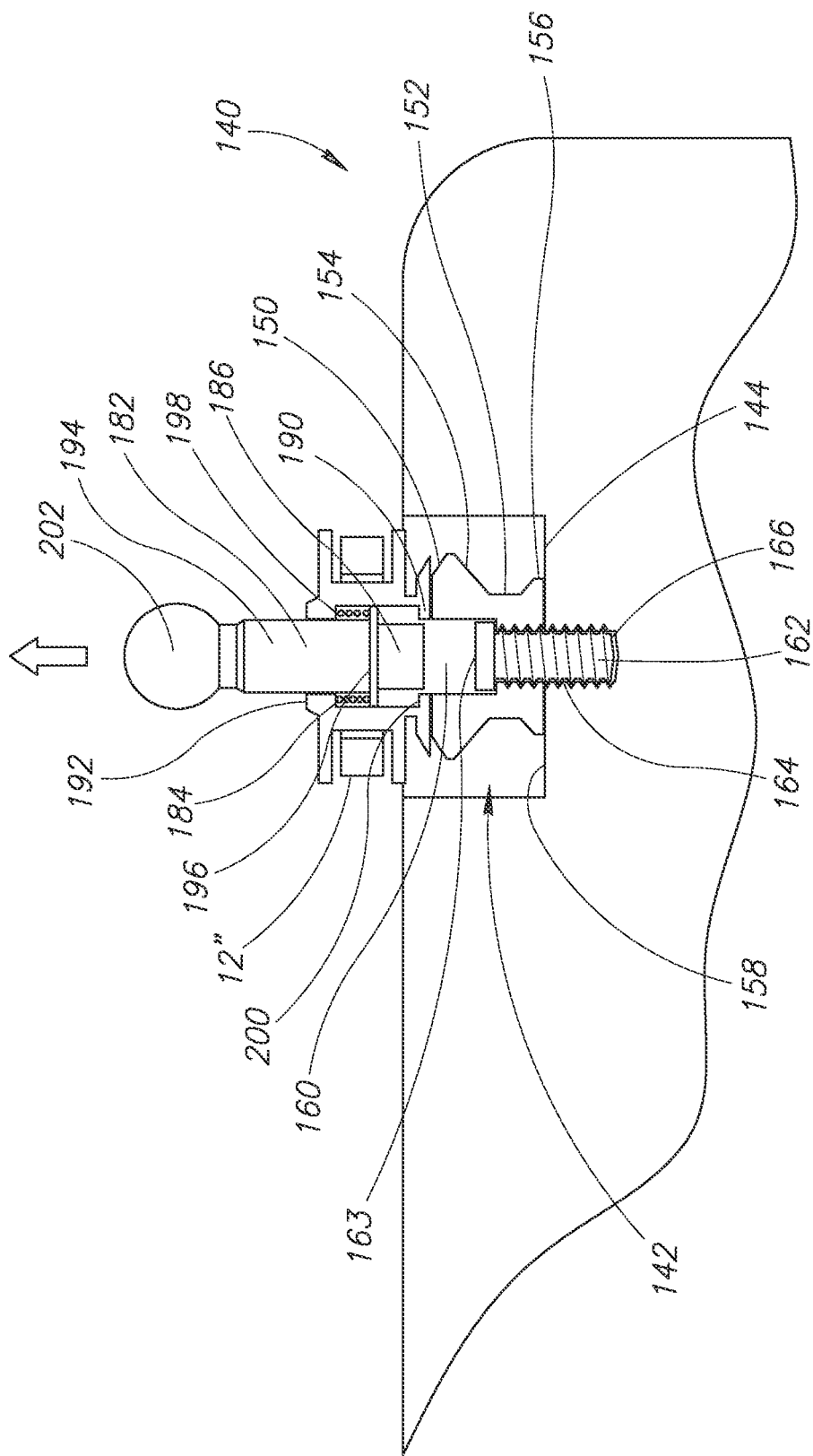
FIG. 10E is an enlarged sectional view of the camera connector of FIG. 10A taken substantially along the line 10E-10E of FIG. 100.

The camera mounted post 142, as best shown in FIGS. 10A and 10E, is a unitary member having a head portion 150 at its upper or outer end which is above a neck portion 152 of smaller diameter with the head portion and neck portion being separated from one another by a downwardly angled radial shoulder 154. Below the neck portion 152 is a larger diameter base portion 156 which engages a floor 158 of the cavity 144. The head portion 150 of the post 142 includes a cylindrical opening 160 and the base portion 156 of the post has a smaller diameter opening therethrough and aligned with a threaded opening 166 in the camera 140. A screw 162 has a head 163 positioned in the opening 160 and a shank 164 that extends through and beyond the lower end of the post 142 and is threadably received in the threaded opening 166 in the camera 140 to fix the post 142 to the camera 140.

Figure 10F:
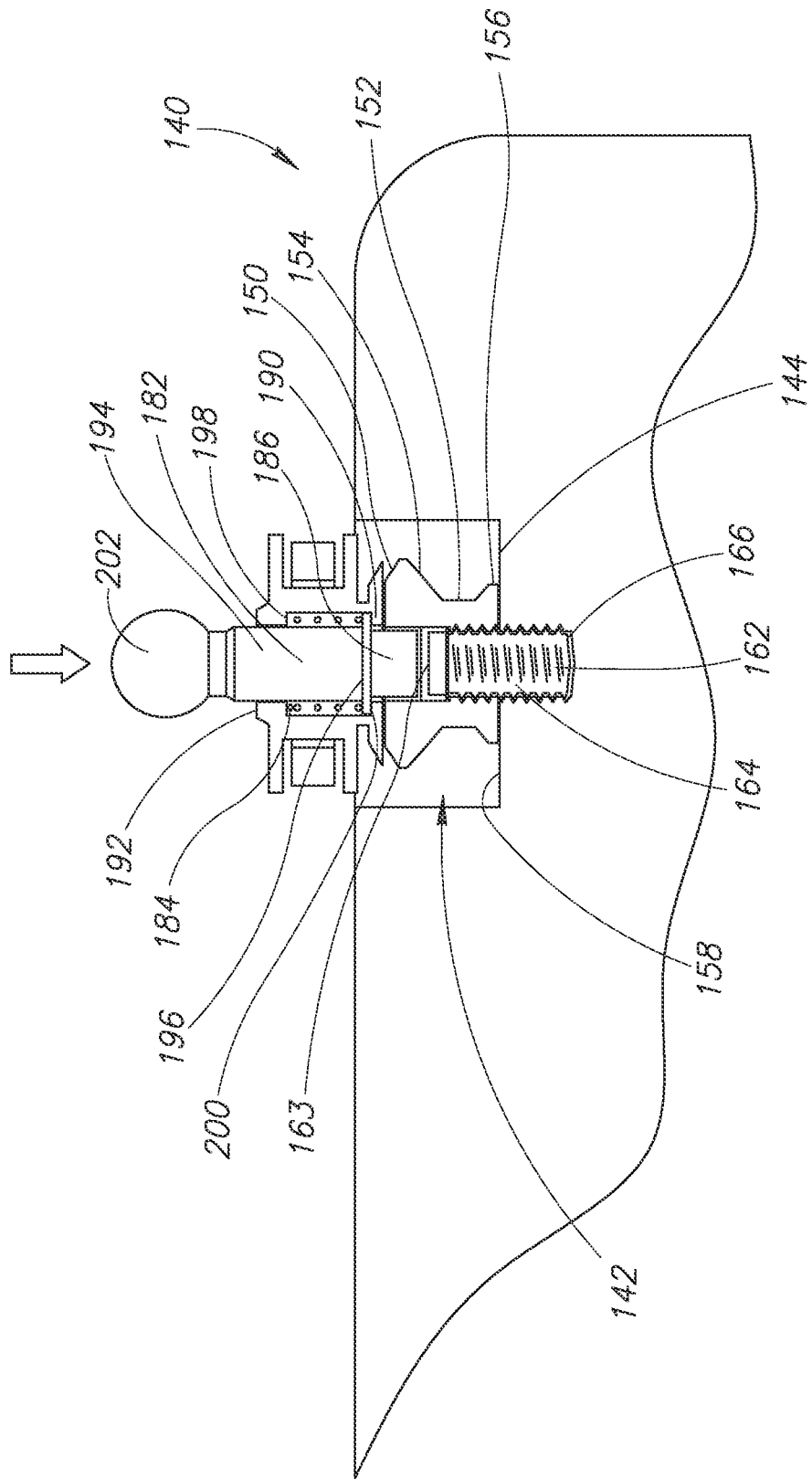
FIG. 10F is an enlarged sectional view of the camera connector of FIG. 10A taken substantially along the line 10E-10F of FIG. 100.
Figure 10G:
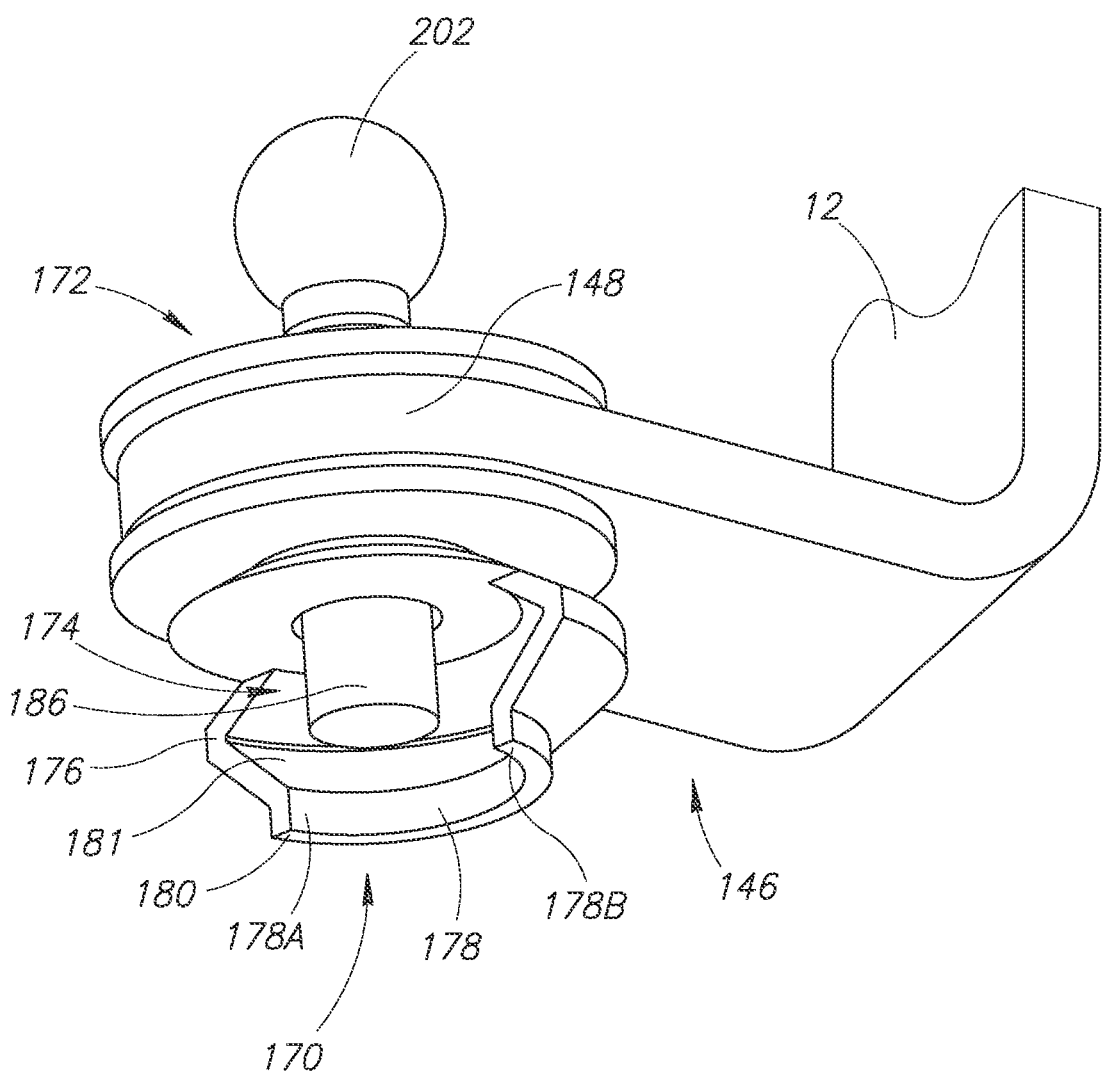
FIG. 10G is an enlarged bottom perspective view of the camera connector of FIG. 10A.

As shown best in FIGS. 10A and 10G, the strap coupled part 146 includes a body having a receiver portion 170 and an upper portion 172. The receiver portion 170 defines a receiver cavity 174 that comprises a laterally facing mouth 176. The receiver portion 170 also comprises a slot 178 which extends inwardly from the mouth 176 and which is defined by a generally U-shaped lower edge 180, as shown in FIG. 10G.

The cavity 174 is sized to accommodate the head portion 150 of the post 142 therein, wherein the head portion 150 is movable into and out of the cavity 174 through the mouth 176 with the neck portion 152 of the post 142 at the same time extending through and moving along the slot 178. For this reason, two parallel portions 178A and 178B of the slot 178 are spaced from one another by a distance which is only slightly greater than the diameter of the neck portion 152 of the post 142 but which is less than the diameter of the head portion 150.

The marginal portions of a bottom wall 181 adjacent the slot 178 engage the shoulder 154 (see FIG. 10E) on the post 142 to prevent the post and strap coupled part 146 from moving any way other than laterally and rotatively relative to one another.

To hold the post 142 and strap coupled part 146 in a connected condition, the upper portion 172 of the body of the strap coupled part 146 carries a vertically movable plunger 182 which is biased by a spring 184 into a lower-limited position shown in FIGS. 10D and 10F and which is manually movable to an upper-limited position shown in FIGS. 10C and 10E. The plunger 182 has a lower end portion 186 which, in the lower position of the plunger, is received in the opening 160 of the post 142. This locks the post 142 to the strap coupled part 146 to prevent these two parts from moving laterally relative to one another, but nevertheless, the two parts are free to move pivotally relative to one another about a common central axis of the plunger and post. When the plunger 182 is moved manually to its upper-limited position (FIGS. 10C and 10E), the lower end portion 186 of the plunger is moved out of the opening 160 of the post head 150 to allow the post 142 to be moved freely into and out of the receiving cavity 174 of the strap coupled part 146.

The upper portion 172 of the strap coupled portion 146 has a lower bore 190 which slidably receives the lower end portion 186 of the plunger 182, and an upper bore 192 which slidably engages an upper portion 194 of the plunger. The plunger 182 has a stop ring 196 affixed thereto at a location to be between the lower and upper bores 190 and 192. The spring 184, which biases the plunger 182 to its lower-limited position, is received between the upper bore 192 and the stop ring 196. When the plunger 182 is moved to its upper-limited position the spring 184 is compressed between a stop ring 196 coupled to the plunger 182 and a top end 198 or shoulder of the upper portion below the upper bore 192. The stop ring 196 is axially fixed to the plunger 182 and is engageable with a lower shoulder 200 above the lower bore 190 to define the lower-limited position of the plunger. A knob 202 coupled to (e.g., threaded onto) the upper end of the upper portion 194 of the plunger 182 provides a convenient means for manually grasping the plunger 182 to move it from its lower to its upper-limited position for detachment of the strap coupled part 146 from the post 142, and hence from the camera 140.

FIGS. 11A-11E illustrate various views of another embodiment of a camera connector 210 that is couplable to a camera 212. The camera connector 210 comprises a hollow base portion 214 and a strap coupling portion 216 each having a rod (218 and 220, respectively) connected thereto. The rods 218 and 220 are coaxially pivotably coupled together such that the base portion 214 and the strap coupling portion 216 may freely rotate relative to each other. As shown in the sectional views of FIGS. 11B and 11E, the base portion 214 includes a spring 222 housed therein that is coupled between two locking members 224A and 224B that extend outward from opposite open ends of the base portion. The locking members 224A and 224B each include a locking tab 226A and 226B, respectively, positioned on a top surface thereof.

The locking tabs 226A and 226B may be grasped by a user in order to move the locking members 224A and 224B toward each other against the outward bias of the spring 222.

Figure 11A:
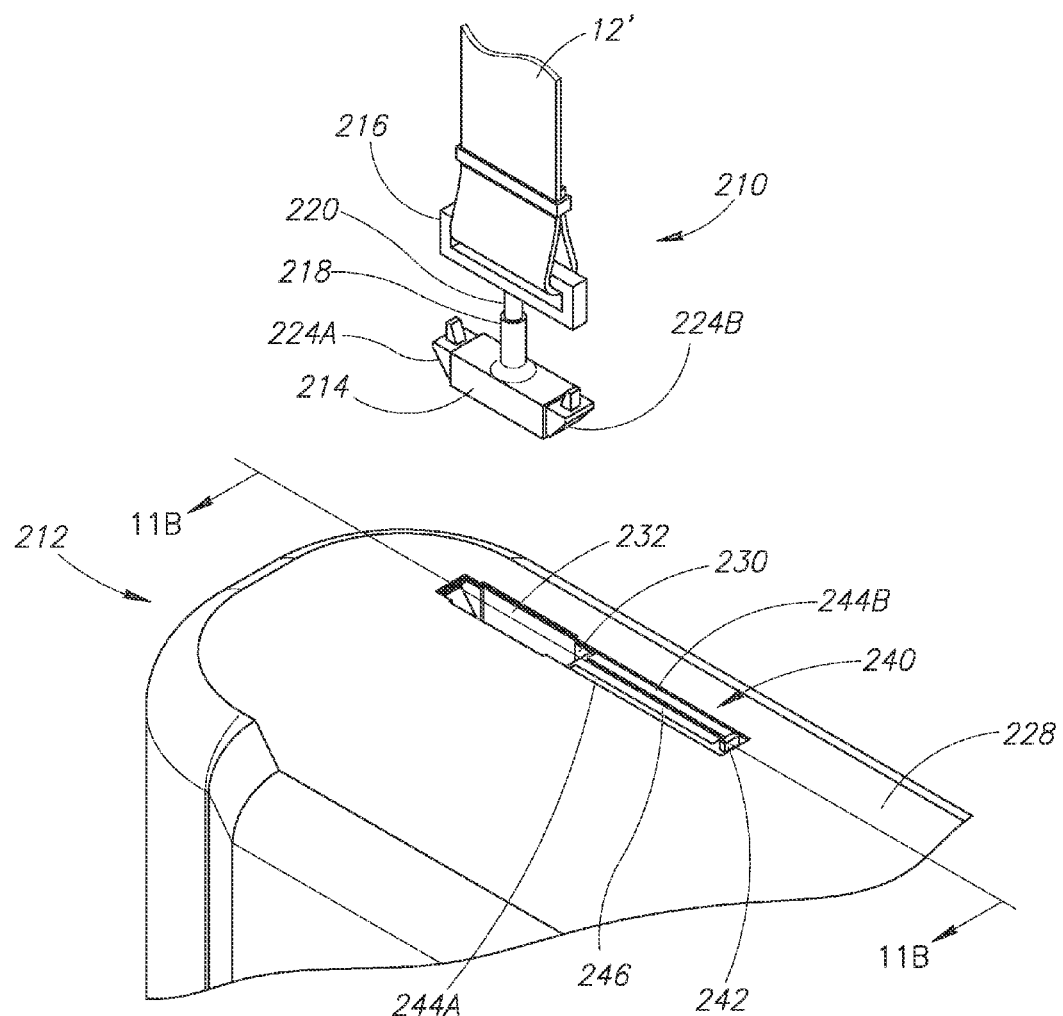
FIG. 11A is a perspective view of a fourth embodiment of a camera connector when disconnected from a camera.
Figure 11B:
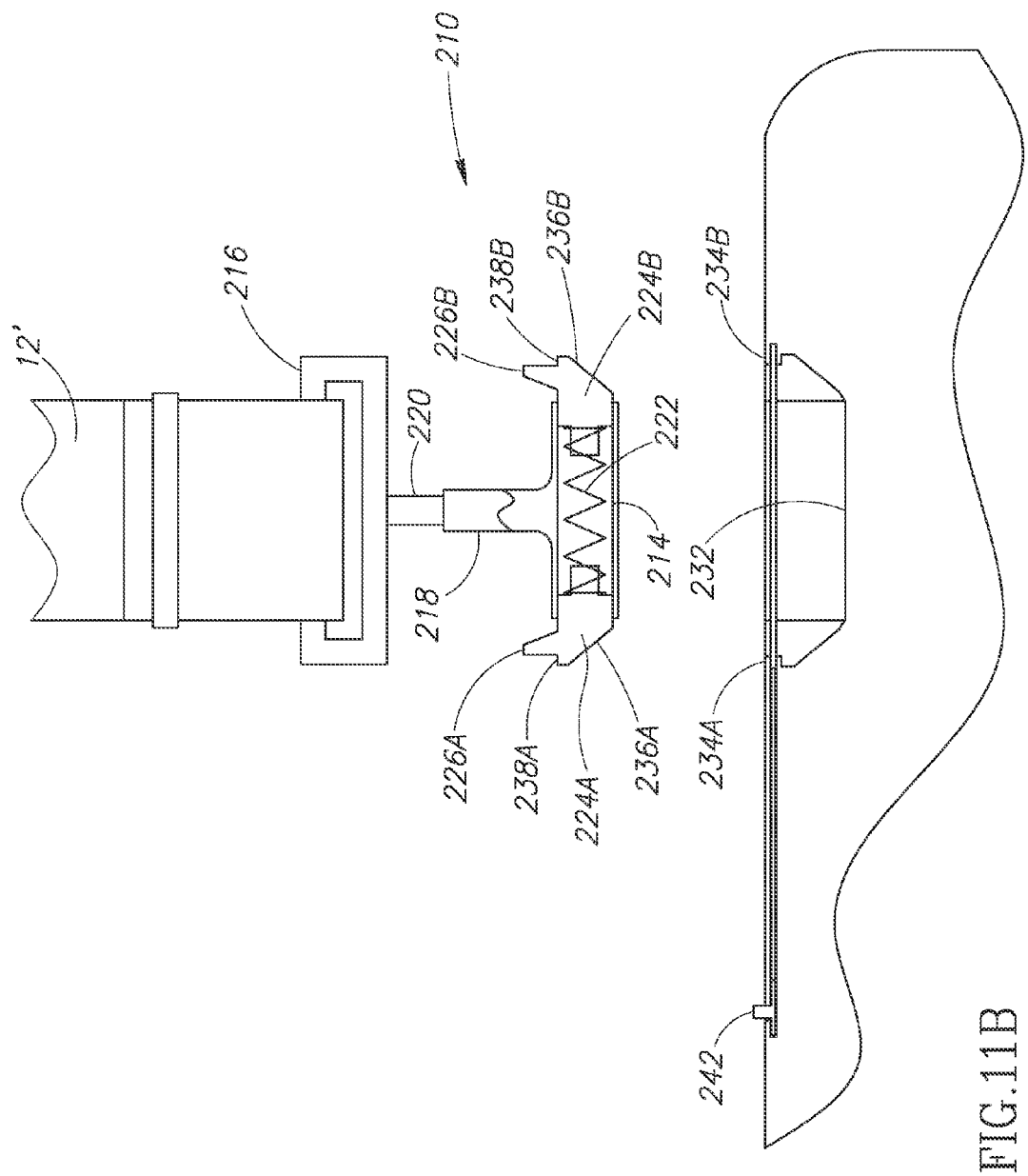
FIG. 11B is a sectional view of the camera connector of FIG. 11A taken substantially along the line 11B-11B of FIG. 11A.
Figure 11C:
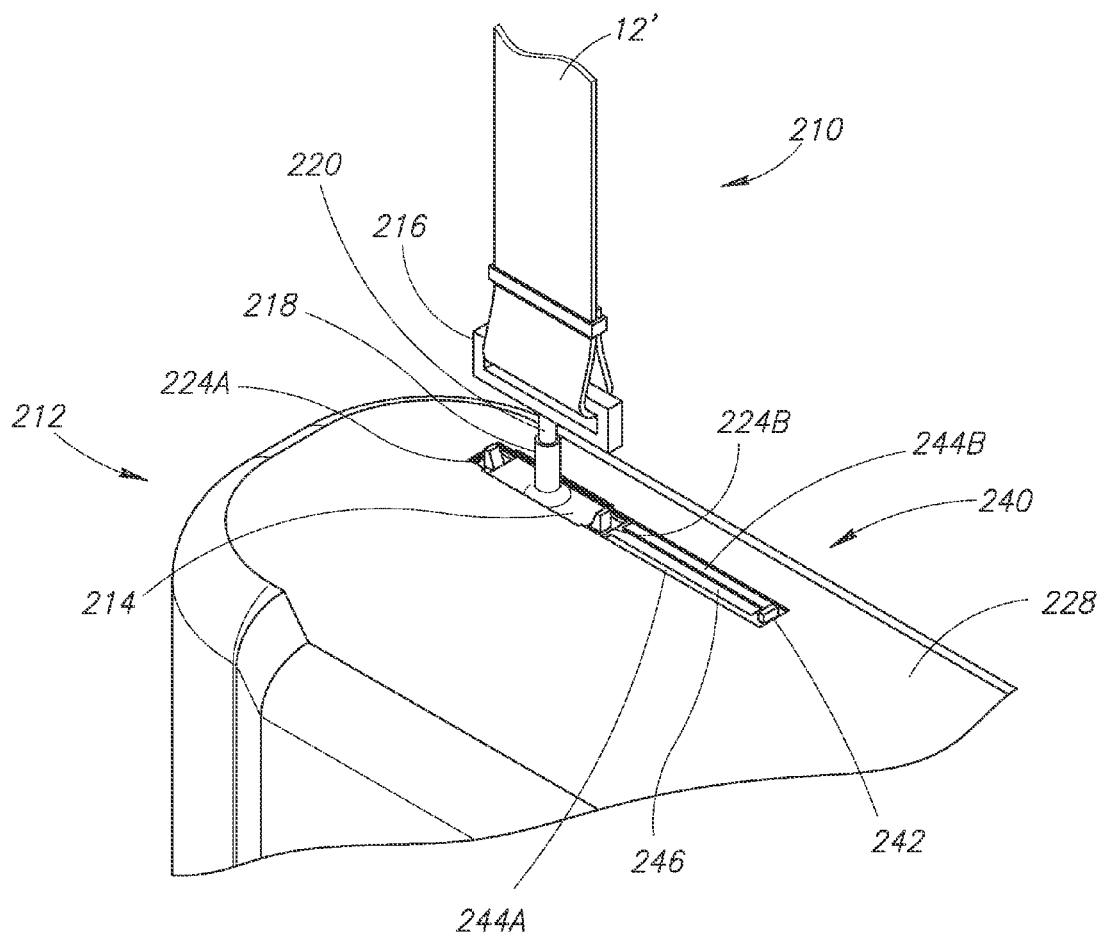
FIG. 11C is a perspective view of the camera connector of FIG. 11A when the camera connector is connected to the camera.
Figure 11D:
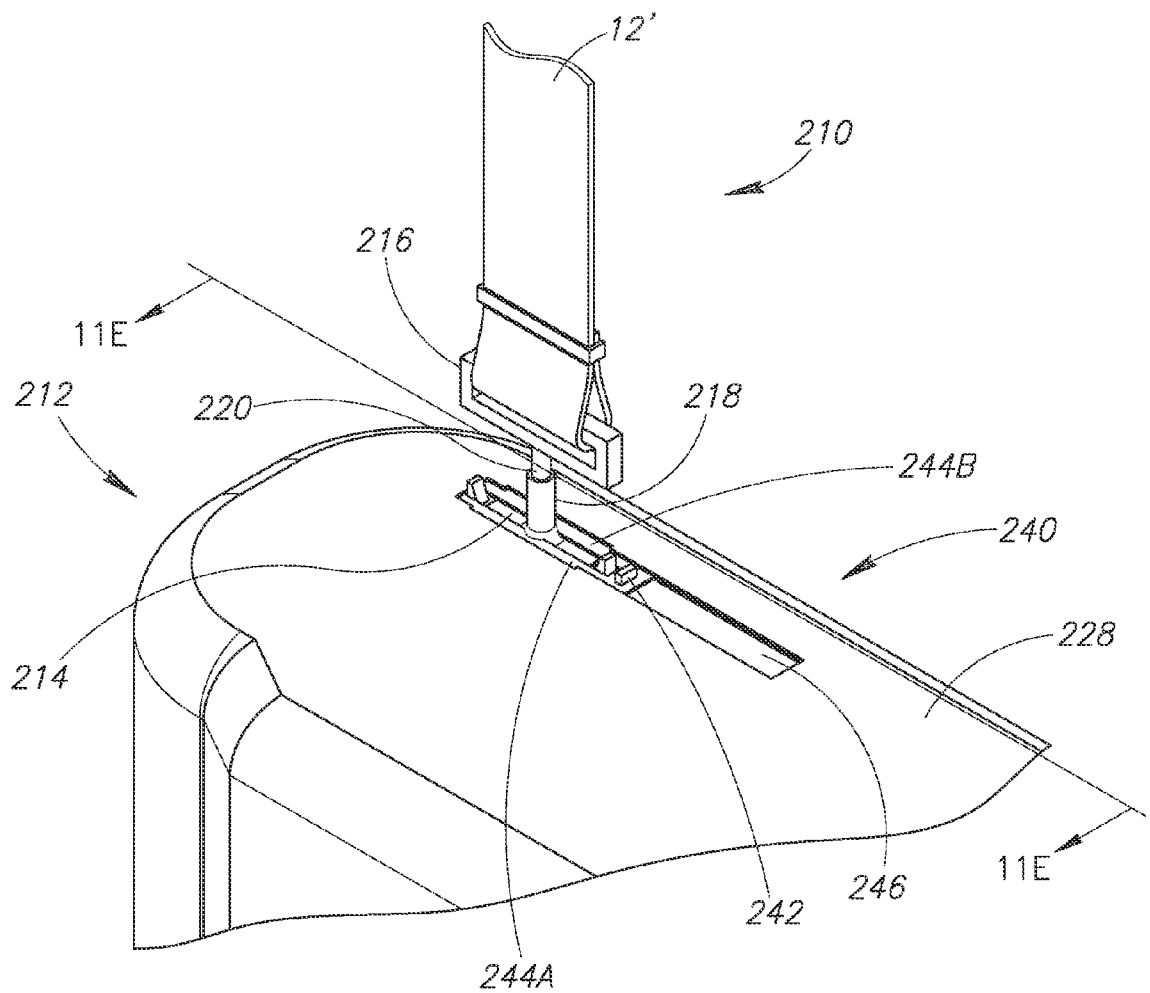
FIG. 11D is a perspective view of the camera connector of FIG. 11A when the camera connector is connected to the camera and a sliding plate is positioned in a closed position over the camera connector.
Figure 11E:
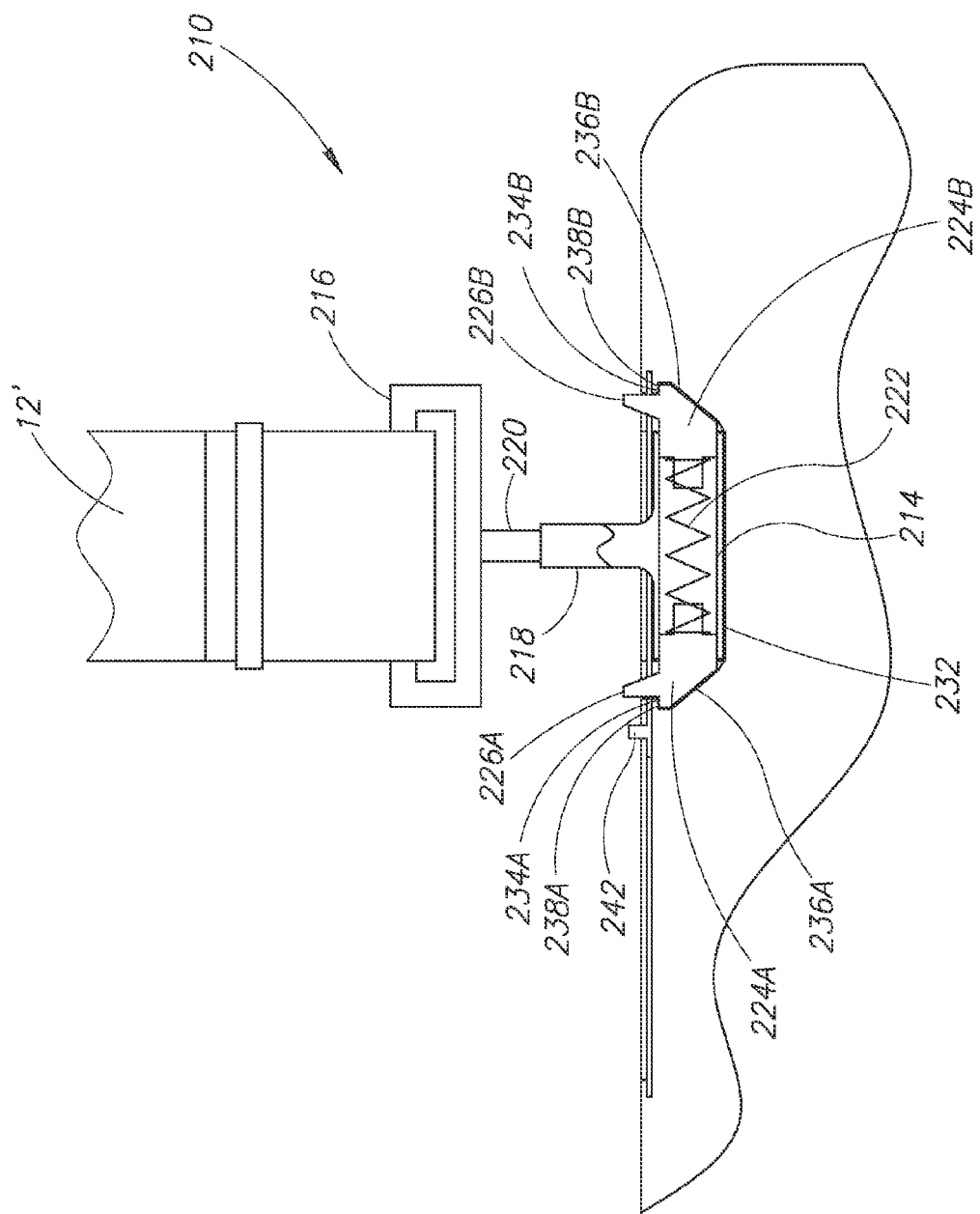
FIG. 11E is a sectional view of the camera connector of FIG. 11A taken substantially along the line 11E-11E of FIG. 11D.
Figure 12:
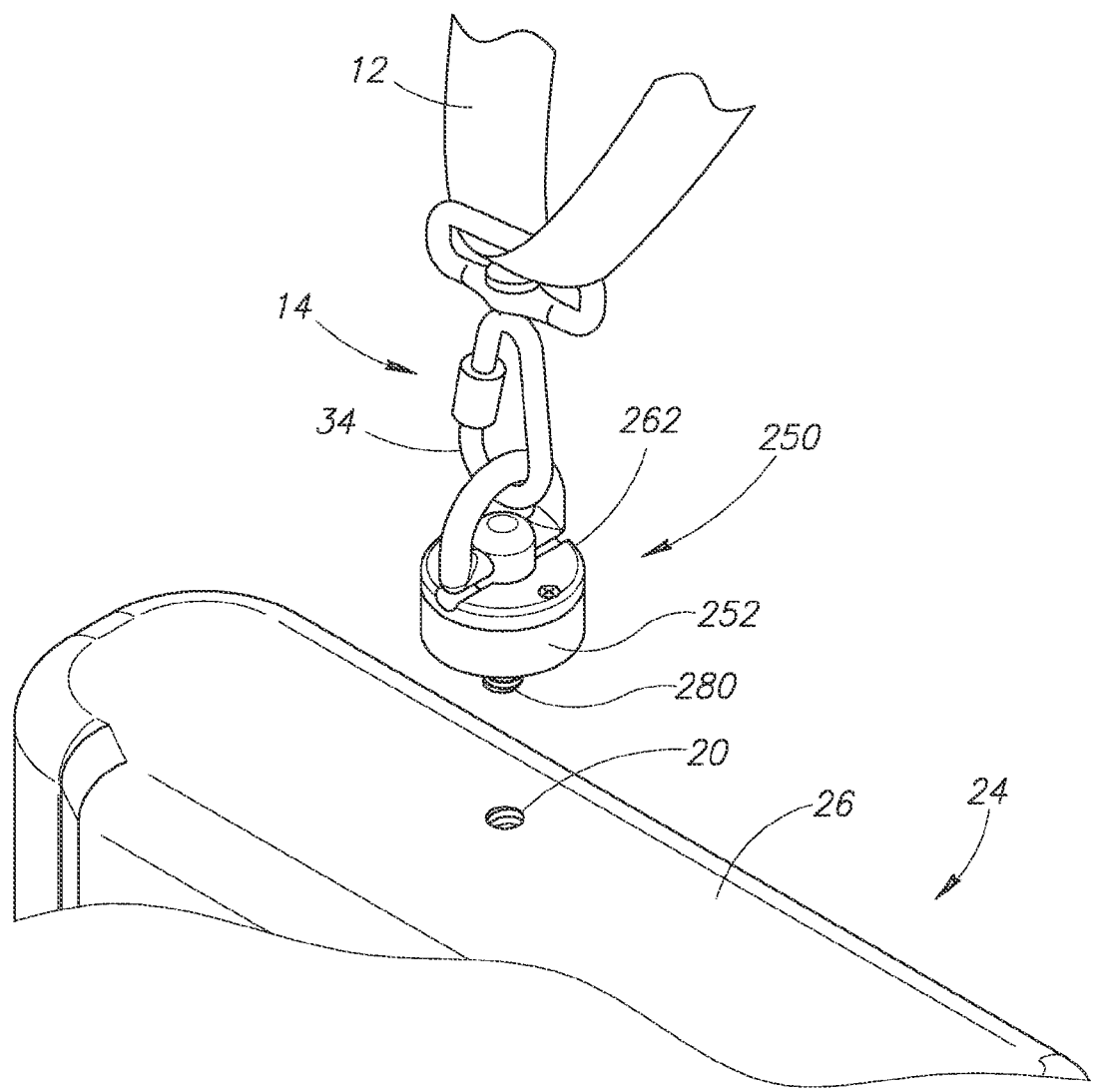
FIG. 12 is a perspective view of a fifth embodiment of a camera connector when disconnected from a camera.
Figure 13:
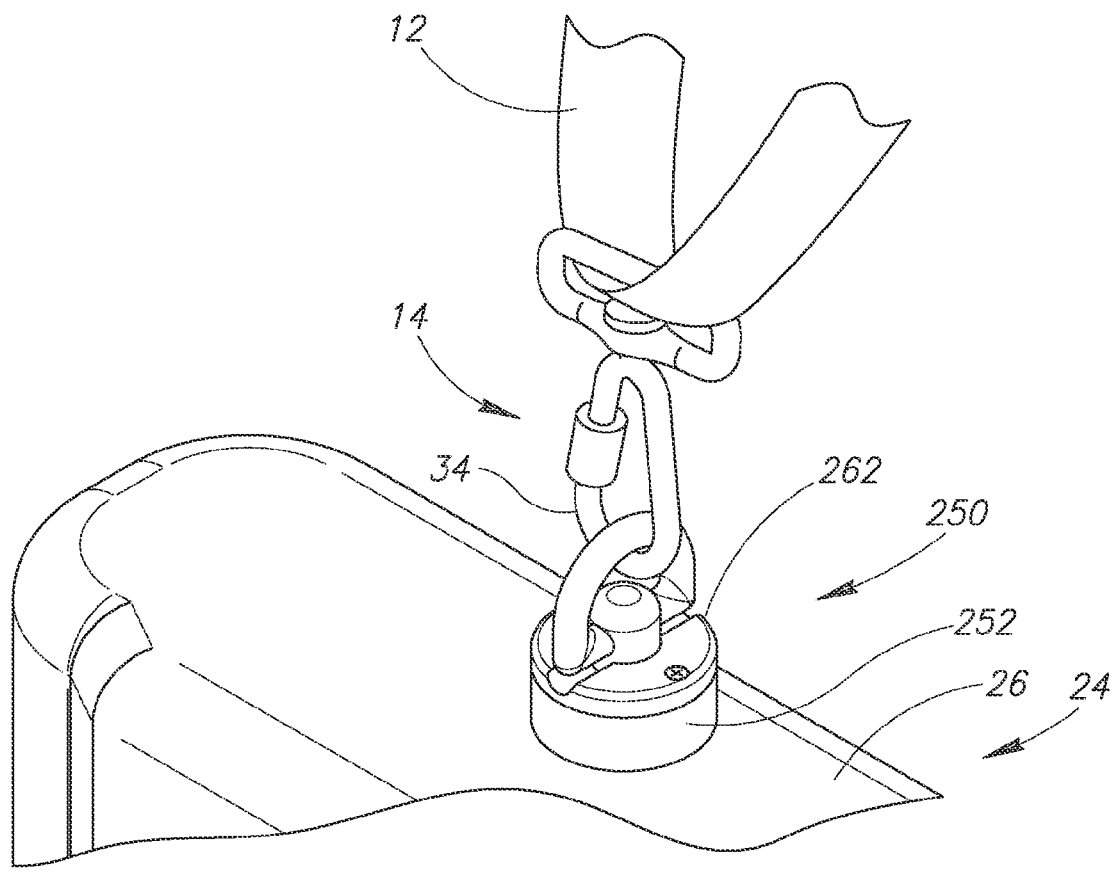
FIG. 13 is a perspective view of the camera connector of FIG. 12 when the camera connector is connected to the camera.
Figure 14A:
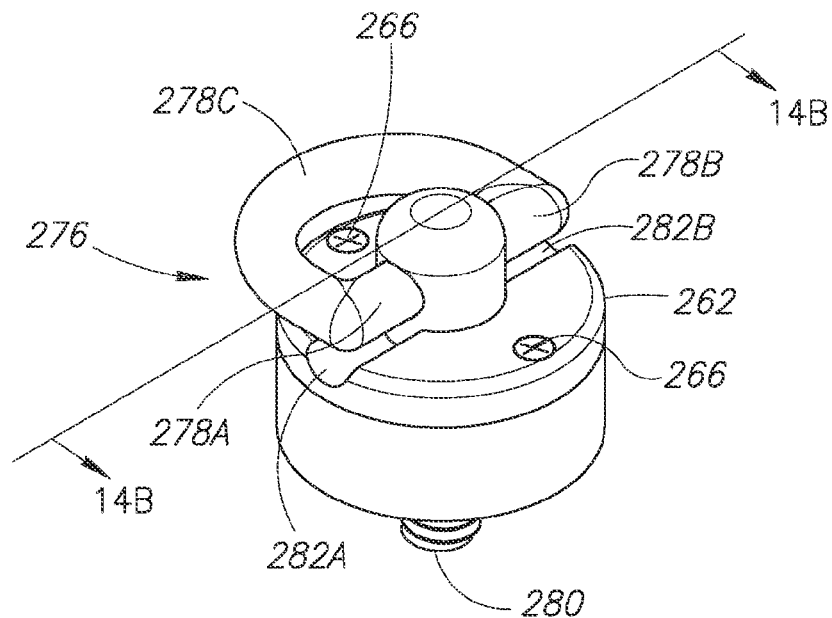
FIG. 14A is an enlarged perspective view of the camera connector of FIG. 12 when a ring of the camera connector is positioned in a horizontal position and a ring support member of the camera connector is positioned in a raised position.
Figure 14B:
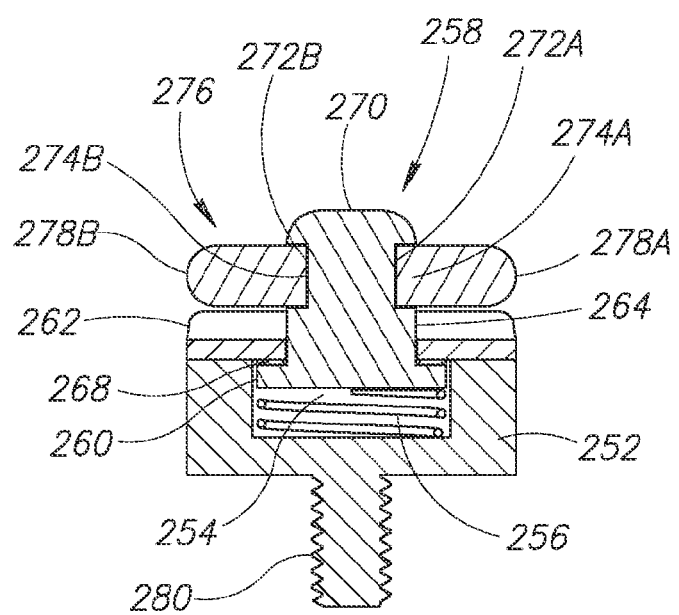
FIG. 14B is a sectional view of the camera connector of FIG. 14A taken substantially along the line 14B-14B of FIG. 14A.
Figure 15A:
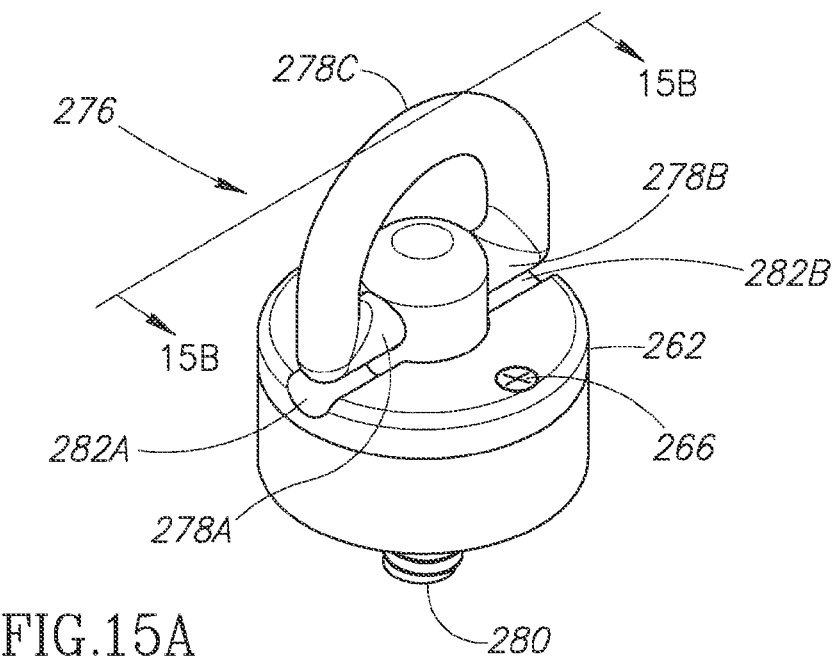
FIG. 15A is an enlarged perspective view of the camera connector of FIG. 14A when the ring is positioned in a vertical position and the ring support member is positioned in the raised position.
Figure 15B:
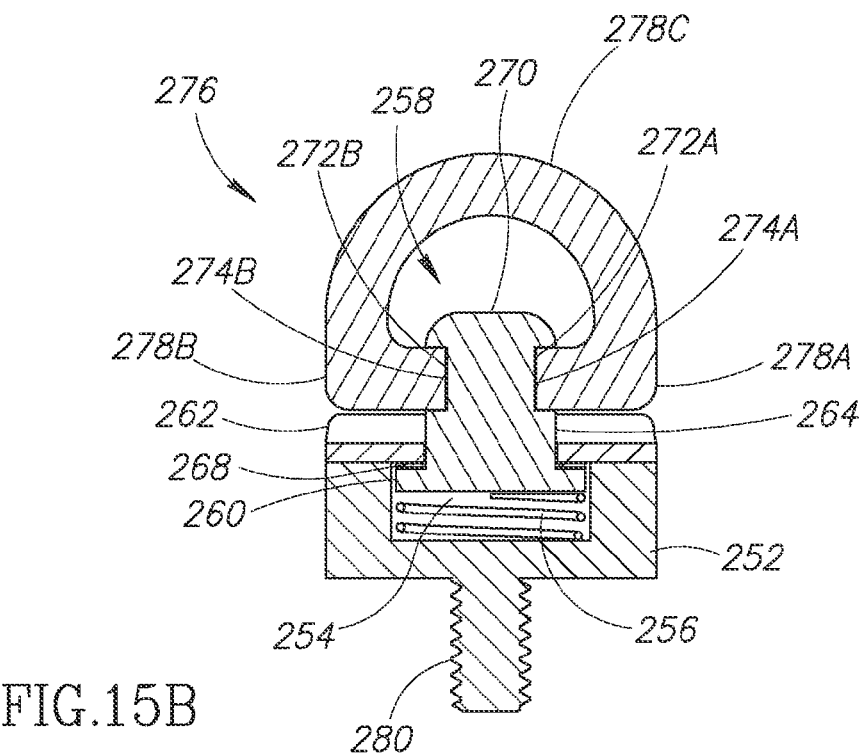
FIG. 15B is a sectional view of the camera connector of FIG. 14A taken substantially along the line 15B-15B of FIG. 15A.

As shown in FIGS. 11A and 11B, a bottom surface 228 of the camera 212 includes recessed portion 230 that includes a cavity 232 having a shape configured to receive the base portion 214 and the locking members 224A and 224B of the camera connector 210. As shown in FIGS. 11C and 11E, the base portion 214 and locking members 224A and 224B of the camera connector 210 are insertable into the cavity 232 positioned in the bottom surface 228 of the camera 212. As shown in FIGS. 11B and 11E, the bottom surface 228 of the camera 212 near the cavity 232 includes inward-facing flange or locking portions 234A and 234B that extend partially over opposing end portions of the cavity 232. The flange portions 234A and 234B are spaced apart from each other by a distance that is slightly smaller than the distance between outermost portions of the locking members 224A and 224B. Thus, when the base portion 214 is inserted into the cavity 232, the flange portions 234A and 234B engage lower upwardly and outwardly angled surfaces 236A and 236B, respectively, (see FIG. 11B) of the locking members 224A and 224B and force the locking members inward against the bias of the spring 222. Once the base portion 214 and locking members 224A and 224B have been fully inserted into the cavity 232, the locking members are below the flange portions 234A and 234B, respectively, which allows the locking members under the outward bias force of the spring 222 to move outward into a locked position (see FIG. 11E) whereat the flange portions are inward of the flange portions 234A and 234B of the camera 212 and hence restrict the vertical movement of the base portion and lock members by acting on respective shoulder portions 238A and 238B of the lock members 224A and 224B when an upward force is applied to the camera connector 210 relative to the camera 212.

When a user wishes to remove the camera connector 210 from the camera 212, the user asserts inward forces on the locking tabs 226A and 226B (e.g., by pinching the locking tabs toward each other) to move the locking members 224A and 224B inward such that the shoulders 238A and 238B are clear of the respective flange portions 234A and 234B so that the camera connector may be lifted vertically without the shoulder portions contacting the flange portions.

Disposed within the recessed portion 230 in the bottom surface 228 of the camera 212 is a sliding plate 240 comprising a raised grip tab 242 and first and second spaced apart prongs 244A and 244B forming an opening 246 therebetween. The opening 246 between the first and second prongs 244A and 244B, respectively, is sized to receive the locking tabs 226A and 226B and the post 218 of the camera connector 210 between the first and second prongs 244A and 244B when the user slides the sliding plate 240 from an open position shown in FIGS. 11A-C to a closed position shown in FIGS. 11D-E. To move the sliding plate 240 from the opened position to the closed position and vice versa, the user may apply a horizontal force to the raised grip tab 242 of the sliding plate. When in the closed position, the sliding plate 240 provides additional support for securing the camera connector 210 within the cavity 232 and to the camera 212 to prevent accidental disconnection of the camera connector from the camera.

Once the camera connector 210 is coupled to the camera 212, the pivotally connected base 214 allows the camera connector 210 to freely rotate relative to the camera during use.

FIGS. 12, 13, 14A-B, 15A-B, and 16A-B illustrate another embodiment of a camera connector 250. In this embodiment, the camera connector 250 comprises a cylindrical body portion 252 having an upward-facing cavity 254 therein which houses a spring 256 (see FIG. 14B). The camera connector 250 further includes a ring support member 258 having a lower flange portion 260. The ring support member 258 is positionable partially within the cavity 254 so that the flange portion 260 compresses the spring 256. A cap member 262 having an aperture 264 therein is positionable over the ring support member 258. The aperture 264 of the cap member 262 is sized to restrict the vertical movement of the ring support member 258 due to its diameter being smaller than the flange portion 260 of the ring support member. The cap member 262 may be secured to the body portion 252 of the camera connector 252 using screws 266 (see FIG. 14A) or any other suitable fastener or means. A friction-reducing washer 268 (e.g., Delrin®-Acetal washer) may be positioned above the flange portion 260 of the ring support member 258 and below the cap member 262 so that the ring support member may freely rotate relative to the body portion 252.

An upper portion 270 of the ring support member 258 includes opposing ring recesses 272A and 272B configured to receive respective ends 274A and 274B of a D-ring 276. The ring 276 includes spaced-apart left and right base portions 278A and 278B and a curved portion 278C extending between the left and right base portions. When coupled to the ring support member 258, the ring 276 forms a loop configured to receive the strap connector 14, as described above.

The camera connector 250 also includes a threaded shaft 280 extending downward from the body portion 252 that is configured to threadably engage with the socket 20 positioned in the bottom surface 26 of the camera 24.

Figure 16A:
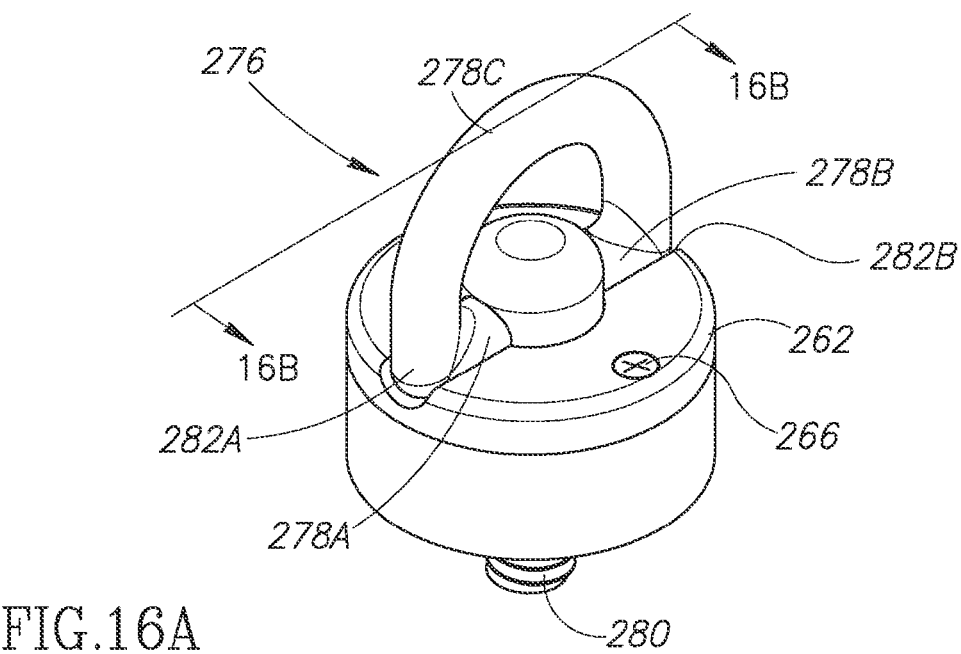
FIG. 16A is an enlarged perspective view of the camera connector of FIG. 14A when the ring is positioned in the vertical position and the ring support member is positioned in a lowered position.
Figure 16B:
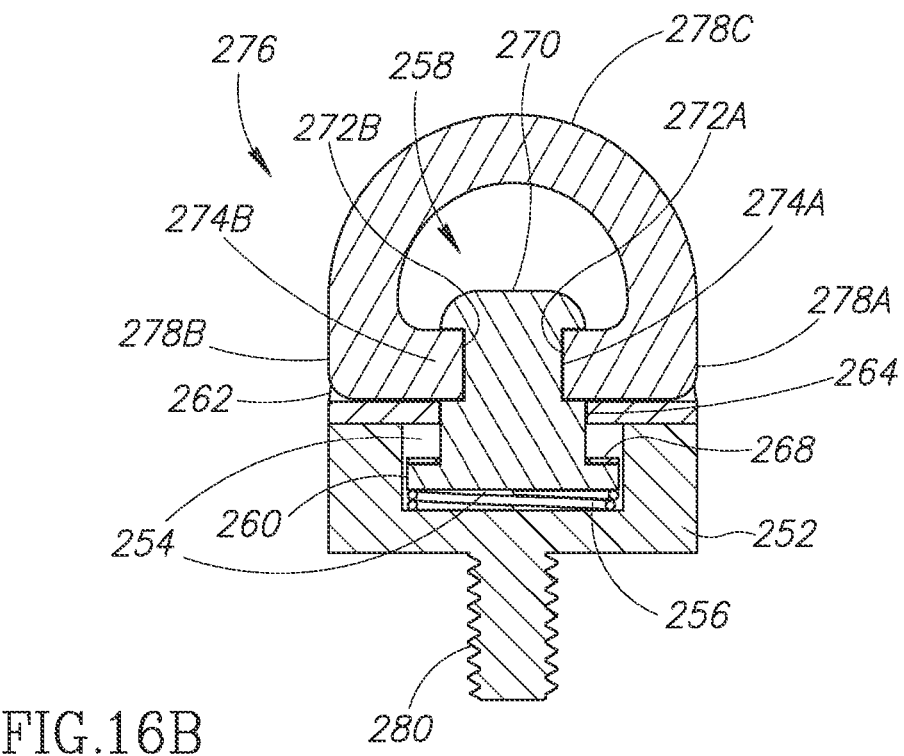
FIG. 16B is a sectional view of the camera connector of FIG. 14A taken substantially along the line 16B-16B of FIG. 16A.

As discussed above, the ring support member 258 and the ring 276 are freely rotatable relative to the body portion 252. In order to allow a user to grasp the ring 276 while threadably engaging and disengaging the camera connector 250 from the camera 24, a feature is provided which allows the user to temporarily fix the rotational position between ring and the body portion. To achieve this, the cap member 262 includes a left groove 282A and a right groove 282B configured to receive a lower portion of the left base 278A and right base 278B, respectively, of the ring 276. As shown in FIGS. 16A and 16B, a user may exert a downward force on the ring 276 and ring support member 258 to overcome the bias of the spring 256 such that the left base 278A and right base 278B of the ring 276 enter the left groove 282A and the right groove 282B, respectively (or vice versa when the ring is rotatable 180° relative to the cap member). In this position, the ring 276 and the body portion 252 are temporarily rotationally fixed relative to each other so that the user may apply a rotational force to the ring which is transmitted to the body portion 252 to rotate the threaded shaft 280 to threadably engage or disengage the camera connector 250 from the camera 24. As can be appreciated, this feature provides a relatively large "tool" for the user to grasp when connecting and disconnecting the camera connector 250 from the camera 24. Once the user releases the ring 276, the spring 256 forces the ring support member 256 upward away from the camera 24 into the position shown in FIGS. 15A and 15B whereat the ring is once again freely rotatable relative to the body portion 252. As discussed above with reference to other embodiments, the ability of the ring 276 to freely rotate prevents binding or tangling of the camera strap 12.

The foregoing embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the ter "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

I claim:

1. A camera connector for coupling with a threaded socket of a camera and for use with a camera strap having a connector, the camera connector comprising:
   a threaded shaft sized to threadably engage with the threaded socket of the camera along an axis of rotation;
   a base portion coupled to the threaded shaft to rotate the threaded shaft upon rotation of the base portion, the base portion including an outer surface configured for permitting a user to grasp the base portion and apply a rotational force thereto to selectively engage the threaded shaft with the threaded socket of the camera, the base portion having a base portion cavity, an upper wall portion extending at least partially over the base portion cavity and a base portion aperture extending upward through the upper wall portion;
   a rotatable portion rotatably coupled to the base portion and extending upward therefrom, the rotatable portion being configured to rotate relative to the base portion about the axis of rotation, the rotatable portion being configured for vertical displacement between a first position and a second position, the rotatable portion having an upper portion sized to pass through the base portion aperture and a lower portion within the base portion cavity and sized to be unable to pass through the base portion aperture with upward movement of the lower portion limited by the upper wall portion so as to limit the vertical displacement of the rotatable portion away from the first position;

a biasing member disposed within the base portion cavity configured to bias the rotatable portion toward the second position; and a loop portion coupled to the rotatable portion for rotation with the rotatable portion about the axis of rotation, the loop portion having an aperture sized to receive the connector of the camera strap, the loop portion having a drive portion which is in driving engagement with a loop engagement portion of the base portion when the rotatable portion is in the first position to selectively fix the rotational position of the loop portion and the rotatable portion relative to the base portion with respect to the axis of rotation, and which is out of driving engagement with the loop engagement portion of the base portion when the rotatable portion is in the second position such that the loop portion and the rotatable portion remain rotatable relative to the base portion about the axis of rotation.

2. The camera connector of claim 1, wherein the second position of the rotatable portion is above the first position of the rotatable portion and the loop engagement portion of the base portion is an upward facing surface of the base portion.

3. The camera connector of claim 1, wherein the lower portion of the rotatable portion within the base portion cavity has an upward facing surface and the upper wall portion has a downward facing surface, and the camera connector further includes a friction-reducing washer positioned between and in engagement with the upward facing surface of the lower portion of the rotatable portion and the downward facing surface of the upper wall portion when the rotatable portion is in the second position.

4. The camera connector of claim 1, wherein the drive portion of the loop portion includes first and second extending portions extending laterally outward in opposite directions from the rotatable portion, and the loop engagement portion of the base portion includes first and second grooves configured to selectively receive the first and second extending portions, respectively, therein when the rotatable portion is in the first position.

5. A connection system for coupling a camera and a camera strap together, the connection system comprising:
a camera having a connection cavity disposed in a recessed portion of a surface of the camera, the connection cavity having a locking portion;
a connector having a camera connector portion couplable to a camera strap coupling portion, the camera strap coupling portion being couplable to the camera strap, the camera connector portion being sized to be inserted into the connection cavity and releasably secured within the connection cavity by the locking portion: and
a sliding plate disposed in the recessed portion configured for displacement between a locked position wherein the sliding plate is positioned in alignment with the connection cavity to restrict the movement of the camera connector portion away from the camera when the camera connector portion is positioned inside the connection cavity, and an unlocked position wherein the sliding plate is not aligned with the connection cavity and permits the camera connector portion to be inserted into and removed from the connection cavity.

6. The connection system of claim 5, wherein the camera connector portion is pivotably couplable to the camera strap coupling portion.

7. The connection system of claim 5, wherein the camera connector portion is rotatable relative to the camera when the camera connector portion is secured within the connection cavity by the locking portion.

8. The connection system of claim 5, wherein the locking portion comprises an outer rim portion of the connection cavity defining a connection cavity opening, the camera connection portion being adjustable between a first position having a larger footprint than the connection cavity opening and a second position having a smaller footprint than the connection cavity opening.

9. The connection system of claim 8, wherein the camera connection portion is automatically moved from the first position to the second position as the camera connection portion is moved into the connection cavity and the camera connection portion contacts the outer rim portion of the connection cavity.

10. The connection system of claim 9, wherein the camera connection portion is automatically moved from the second position to the first position when the camera connection portion is substantially fully positioned inside the connection cavity.

11. The connection system of claim 8, further comprising a biasing member configured to bias the camera connection portion into the first position.

12. The connection system of claim 5, wherein the locking portion comprises an outer rim portion of the connection cavity defining a connection cavity opening, and the camera connection portion comprises a locking member configured for displacement between a first position whereat the locking member causes the camera connection portion to have a footprint that is larger than the connection cavity opening, and a second position whereat the locking member causes the camera connection portion to have a footprint that is smaller than the connection cavity opening.

13. A connection system for coupling a camera and a camera strap together, the connection system comprising:
a camera having a connection cavity with a locking portion;
a connector having a camera connector portion and a camera strap coupling portion, the camera strap coupling portion being couplable to the camera strap, the camera connector portion being sized to be inserted into the connection cavity and releasably secured within the connection cavity by the locking portion; and
a sliding plate configured for displacement between a locked position wherein the sliding plate is positioned in alignment with the connection cavity to restrict the movement of the camera connector portion away from the camera when the camera connector portion is positioned inside the connection cavity, and an unlocked position wherein the sliding plate is not aligned with the connection cavity and permits the camera connector portion to be inserted into and removed from the connection cavity.

14. The connection system of claim 13, wherein the camera connector portion is pivotably coupled to the camera strap coupling portion.

15. The connection system of claim 13, wherein the camera connector portion is rotatable relative to the camera when the camera connector portion is secured within the connection cavity by the locking portion.

16. The connection system of claim 13, wherein the locking portion comprises an outer rim portion of the connection cavity defining a connection cavity opening, the camera connection portion being adjustable between a first position having a larger footprint than the connection cavity opening and a second position having a smaller footprint than the connection cavity opening.

17. The connection system of claim 16, wherein the camera connection portion is automatically moved from the first position to the second position as the camera connection portion is moved into the connection cavity and the camera connection portion contacts the outer rim portion of the connection cavity.

18. The connection system of claim 17, wherein the camera connection portion is automatically moved from the second position to the first position when the camera connection portion is substantially fully positioned inside the connection cavity.

19. The connection system of claim 16, further comprising a biasing member configured to bias the camera connection portion into the first position.

20. The connection system of claim 13, wherein the locking portion comprises an outer rim portion of the connection cavity defining a connection cavity opening, and the camera connection portion comprises a locking member configured for displacement between a first position whereat the locking member causes the camera connection portion to have a footprint that is larger than the connection cavity opening, and a second position whereat the locking member causes the camera connection portion to have a footprint that is smaller than the connection cavity opening.

21. A camera connector for coupling with a threaded socket of a camera and for use with a camera strap having a connector, the camera connector comprising:
 a threaded shaft sized to threadably engage with the threaded socket of the camera along an axis of rotation;
 a base portion coupled to the threaded shaft to rotate the threaded shaft upon rotation of the base portion, the base portion having a base portion cavity and a retainer portion extending at least partially over the base portion cavity and defining a retainer opening;
 a rotatable portion rotatably coupled to the base portion and having a first portion retained within the base portion cavity by the retainer portion and a second portion extending away from the first portion through the retainer opening, the rotatable portion being configured to rotate relative to the base portion about the axis of rotation, the rotatable portion being configured for displacement along the axis of rotation between a first position and a second position with movement of the rotatable portion along the axis of rotation away from the first position being limited by the retainer portion; and
 a loop portion coupled to the second portion of the rotatable portion for rotation with the rotatable portion about the axis of rotation, the loop portion having an aperture sized to receive the connector of the camera strap, the loop portion having a drive portion which is in driving engagement with a loop engagement portion of the base portion when the rotatable portion is in the first position to selectively fix the rotational position of the loop portion and the rotatable portion relative to the base portion with respect to the axis of rotation, and which is out of driving engagement with the loop engagement portion of the base portion when the rotatable portion is in the second position such that the loop portion and the rotatable portion remain rotatable relative to the base portion about the axis of rotation.

22. The camera connector of claim 21, further including a biasing member disposed within the base portion cavity configured to bias the rotatable portion toward the second position.

23. The camera connector of claim 21, wherein the loop engagement portion of the base portion is at least one groove in an outward surface of the retainer portion sized to receive at least a portion of the loop portion when the rotatable portion is in the first position.

24. The camera connector of claim 21, further including a friction-reducing washer positioned between the first portion of the rotatable portion and the retainer portion.

25. The camera connector of claim 21, wherein the drive portion of the loop portion includes first and second extending portions extending laterally outward in opposite directions from the second portion of the rotatable portion, and the loop engagement portion of the base portion includes first and second grooves configured to selectively receive the first and second extending portions, respectively, therein when the rotatable portion is in the first position.

* * * * *